US009696472B2

(12) United States Patent
Kurtz et al.

(10) Patent No.: US 9,696,472 B2
(45) Date of Patent: Jul. 4, 2017

(54) STEREO VIEWING DEVICE

(71) Applicant: IMAX THEATRES INTERNATIONAL LIMITED, Dublin (IE)

(72) Inventors: Andrew F. Kurtz, Macedon, NY (US); Donald R. Diehl, Rochester, NY (US)

(73) Assignee: IMAX THEATRES INTERNATIONAL LIMITED, Dublin (IE)

( * ) Notice: Subject to any disclaimer, the term of this patent is extended or adjusted under 35 U.S.C. 154(b) by 35 days.

(21) Appl. No.: 14/568,974

(22) Filed: Dec. 12, 2014

(65) Prior Publication Data

US 2016/0170220 A1 Jun. 16, 2016

(51) Int. Cl.
*G02B 27/22* (2006.01)
*G02B 27/26* (2006.01)
*G02B 5/22* (2006.01)
*H04N 13/00* (2006.01)
*C09B 23/00* (2006.01)

(52) U.S. Cl.
CPC ............. *G02B 5/223* (2013.01); *G02B 27/22* (2013.01); *G02B 27/2207* (2013.01); *G02B 27/26* (2013.01); *H04N 13/00* (2013.01); *C09B 23/00* (2013.01)

(58) Field of Classification Search
CPC ........ C09K 19/60; G02B 27/22; G02B 27/26; G02B 27/2207; G02B 5/223; H04N 12/0431; H04N 12/0434; H04N 12/0459; H04N 13/0431; H04N 13/0434; H04N 13/0459
See application file for complete search history.

(56) References Cited

U.S. PATENT DOCUMENTS

| 3,262,359 A | | 7/1966 | Carpenter | |
|---|---|---|---|---|
| 4,035,068 A | | 7/1977 | Rawson | |
| 4,311,775 A | * | 1/1982 | Regan | C09B 47/08 430/108.21 |
| 4,382,033 A | * | 5/1983 | Regan | C09B 47/08 540/128 |

(Continued)

FOREIGN PATENT DOCUMENTS

WO  2006/043945 A2  4/2006

OTHER PUBLICATIONS

International Search Report and Written Opinion of the International Searching Authority mailed on May 24, 2016 in related International Patent Application No. PCT/IB2015/059482.

(Continued)

*Primary Examiner* — Shean C Wu
(74) *Attorney, Agent, or Firm* — Buskop Law Group, P.C.; Wendy Buskop

(57) ABSTRACT

A stereo viewing device comprises a first lens comprising a first lens filter, and a second lens comprising a second lens filter. The first lens filter comprises a first set of light absorbing dyes that define a first set of rejection bands. The first set of light absorbing dyes comprises at least a first polymethine dye. The second lens filter comprises a second set of light absorbing dyes that define a second set of rejection bands different from the first set of rejection bands. The second set of light absorbing dyes comprises at least a second polymethine dye.

29 Claims, 12 Drawing Sheets

(56) References Cited

U.S. PATENT DOCUMENTS

| | | | |
|---|---|---|---|
| 6,093,510 A * | 7/2000 | Helber | C09B 23/02 430/20 |
| 6,180,295 B1 * | 1/2001 | Helber | C09B 23/10 430/20 |
| 6,214,499 B1 * | 4/2001 | Helber | C09B 23/0008 430/20 |
| 6,331,385 B1 * | 12/2001 | Deaton | G03C 1/0051 430/567 |
| 6,355,386 B1 * | 3/2002 | Helber | C09B 23/10 252/299.4 |
| 6,361,932 B1 * | 3/2002 | Parton | G03C 1/29 430/572 |
| 6,698,890 B1 * | 3/2004 | Jorke | G02B 27/2207 348/E13.014 |
| 6,908,730 B2 * | 6/2005 | Parton | G03C 1/29 430/559 |
| 7,116,017 B2 | 10/2006 | Ji et al. | |
| 7,524,053 B2 * | 4/2009 | Lipton | G02C 7/12 351/159.56 |
| 7,832,869 B2 * | 11/2010 | Maximus | G02B 26/007 348/60 |
| 7,874,680 B2 | 1/2011 | Aruga | |
| 7,972,020 B2 | 7/2011 | Bartlett et al. | |
| 8,231,224 B2 | 7/2012 | Powell et al. | |
| 2009/0161196 A1 | 6/2009 | Malfait | |
| 2010/0289877 A1 * | 11/2010 | Lanfranchi | G02B 27/2207 348/46 |
| 2011/0102748 A1 | 5/2011 | Shevlin et al. | |
| 2013/0113788 A1 | 5/2013 | Schuck | |
| 2014/0028697 A1 * | 1/2014 | Kurtz | G01J 3/465 345/589 |
| 2014/0293229 A1 * | 10/2014 | Baum | G02B 5/223 353/7 |

OTHER PUBLICATIONS

Yagi et al., "Squarylium Dyes and Related Compounds", Top Heterocycl Chem. 2008, 14: 133-181.

Lequime, "Tunable thin-film filters: review and perspectives", Proc. of SPIE, 2004, 5250: 302-311.

Mishra, et al., "Cyanines during the 1990s: A Review", Chem. Rev., 2000, 100: 1973-2011.

Mullen, "The Contrast Sensitivity of Human Colour Vision to Red-Green and Blue-Yellow Chromatic Gratings", J. Physiol., 1985, 359: 381-400.

Silverstein, et al., "25A: A Laser-Based Digital Cinema Projector", SID Symposium Digest of Technical Papers, 2011, 42(1): 326-329.

Parton, et al., "Antenna Dye Sensitization: Principles and Fluorescence Studies", AGX2004: International Symposium on Silver Halide Technology, 2004, Ventura, California, pp. 161-164.

Harrison, "Liquid-Crystalline J-Aggregates Formed by Aqueous Ionic Cyanine Dyes", IS&T's 50th Annual Conference: Final Program and Proceedings, The Society for Imaging Science and Technology, 1997, Cambridge, Massachusetts, pp. 111-116.

Mustroph, et al., "Relationship between the Molecular Structure of Cyanine Dyes and the Vibrational Fine Structure of their Electronic Absorption Spectra", ChemPhysChem, 2009, 10: 835-840.

Harrison, et al., "Liquid-Crystalline J-Aggregates Formed by Aqueous Ionic Cyanine Dyes", J. Phys. Chem., 1996, 100: 2310-2321.

* cited by examiner

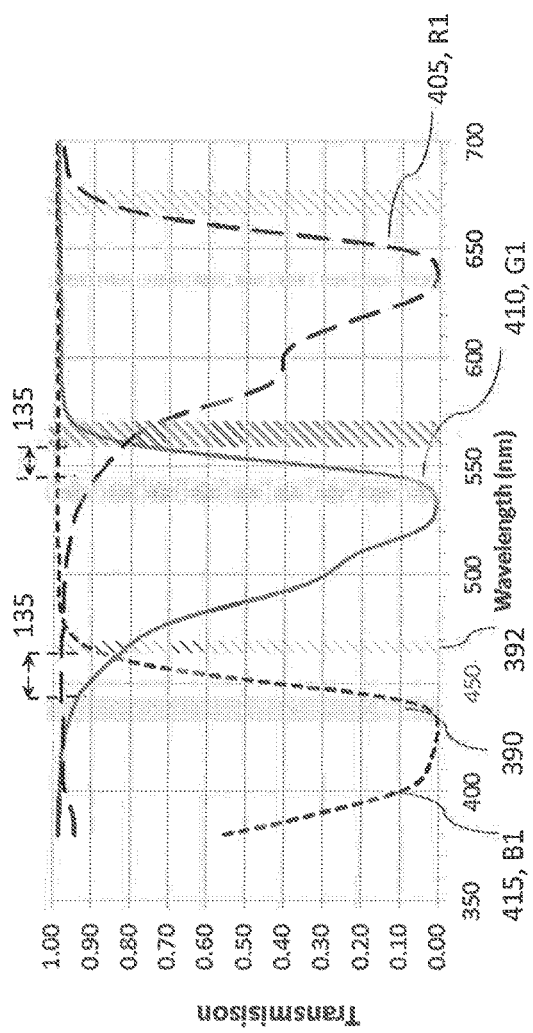
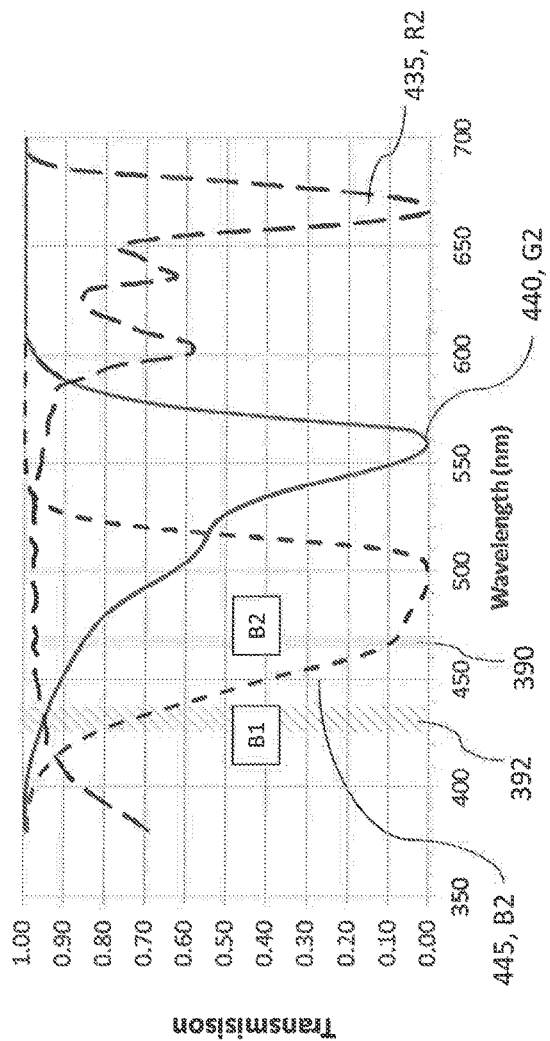
FIG. 6A
FIG. 6B

|  | 430-440 nm | 465-470 nm | 529-535 nm | 555-560 nm | 632-638 nm | 662-667 nm |
|---|---|---|---|---|---|---|
| B1 - Blue Dye, First Eye | 90x | 0.92 | 0.99 | 0.99 | 0.99 | 0.99 |
| B2 - Blue Dye, Second Eye | 0.63 | 10x | 0.95 | 1.0 | 1.0 | 1.0 |
| G1 - Green Dye, First Eye | 0.95 | 0.80 | 50x | 0.68 | 0.99 | 0.99 |
| G2 - Green Dye, Second Eye | 0.94 | 0.86 | 0.42 | 40x | 1.0 | 1.0 |
| R1 - Red Dye, First Eye | 0.98 | 0.98 | 0.93 | 0.83 | 60x | 0.65 |
| R2 - Red Dye, Second Eye | 0.95 | 0.97 | 0.97 | 0.95 | 0.73 | 30x |
| net transmitted first eye | 0.963 | 0.721 | 0.391 | 0.559 | | 0.637 |
| net - second eye | | | | | 0.730 | |

FIG. 6E

| | 430-440 nm | 465-470 nm | 529-535 nm | 555-560 nm | 632-638 nm | 662-667 nm |
|---|---|---|---|---|---|---|
| B1 - Blue Dye, First Eye | 20x | 0.94 | 0.99 | 0.99 | 0.99 | 0.99 |
| B2 - Blue Dye, Second Eye | 0.68 | 10x | 0.96 | 1.0 | 1.0 | 1.0 |
| G1 - Green Dye, First Eye | 0.97 | 0.87 | 10x | 0.8 | 0.99 | 0.99 |
| G2 - Green Dye, Second Eye | 0.96 | 0.91 | 0.63 | 10x | 1.0 | 1.0 |
| R1 - Red Dye, First Eye | 0.98 | 0.98 | 0.99 | 0.87 | 15x | 0.72 |
| R2 - Red Dye, Second Eye | 0.96 | 0.98 | 0.98 | 0.96 | 0.80 | 10x |
| net transmitted - first eye | 0.627 | 0.801 | 0.593 | 0.689 | 0.800 | 0.706 |
| net - second eye | | | | | | |

FIG. 6F

| | 430-440 nm | 465-470 nm | 529-535 nm | 555-560 nm | 632-638 nm | 662-667 nm |
|---|---|---|---|---|---|---|
| B1 - Blue Dye, First Eye | 20x | 0.94 | 0.99 | 0.99 | 0.99 | 0.99 |
| B2 - Blue Dye, Second Eye | 0.68 | 10x | 0.96 | 1.0 | 1.0 | 1.0 |
| G1 - Green Dye, First Eye | 0.95 | 0.80 | 50x | 0.68 | 0.99 | 0.99 |
| G2 - Green Dye, Second Eye | 0.94 | 0.86 | 0.42 | 40x | 1.0 | 1.0 |
| R1 - Red Dye, First Eye | 0.98 | 0.98 | 0.93 | 0.83 | 60x | 0.65 |
| R2 - Red Dye, Second Eye | 0.95 | 0.97 | 0.97 | 0.95 | 0.73 | 50x |
| net transmitted - one eye | 0.607 | 0.737 | 0.391 | 0.555 | 0.730 | 0.637 |
| net - other eye | | | | | | |

FIG. 6G

STEREO VIEWING DEVICE

FIELD

The disclosure generally relates to digital image projection and more particularly to a stereo viewing device for 3-D perception, a method for 3D projection, and a method for making a stereo viewing device.

BACKGROUND

The motion picture industry is presently transitioning from traditional film based projectors to digital or electronic cinema. This trend is accelerating due to the popularity of 3-D movies. Even as digital cinema projection has matured and succeeded, largely based on the use of the well-known Digital Light Projection (DLP) technology, the promise of a further evolution to laser-based projection has been hovering in the background. Laser projection, whether for digital cinema, home projection, or other markets, has long been held back due to the cost and complexity of the laser sources, particularly in the green and blue spectral bands. As the necessary lasers are now becoming increasingly mature and cost competitive, the potential benefits expected from laser projection, including the larger color gamut, more vivid, saturated and brighter colors, high contrast, and low cost optics are increasingly being realized. An exemplary system is described in the paper "A Laser-Based Digital Cinema Projector", by B. Silverstein et al. (SID Symposium Digest, Vol. 42, pp. 326-329, 2011).

Most commonly in cinema, stereo projection has been enabled by polarization techniques, where image content to the left and right eyes is projected using orthogonal polarization states (e.g., horizontal linear and vertical linear polarizations), and viewers wear corresponding glasses. Light of one polarization is transmitted, and light of the opposite polarization is blocked, and the crosstalk between left and right eye images is ideally ≥150:1 for all fields of view. For example, U.S. Pat. No. 4,957,361 (W. Shaw) to IMAX Corp. of Mississauga ONT, CA, provided spectacles with left and right eye filters that are polarized at right angles to each other, and which produce the perception of depth when viewing motion pictures with double images that are likewise polarized at right angles to each other. The laser projector of Silverstein et al., provided linear polarized image light that that worked with such stereo glasses. Alternately, RealD Inc. of Boulder Colo. has commercialized post-projector polarization, using for example the Z-Screen modulator and circularly polarized glasses, the latter described in U.S. Pat. No. 7,524,053 (L. Lipton).

The earliest form of stereo was the anaglyph, first developed by L. du Hauron in 1894. In the traditional printed anaglyph, each eye only sees a color adjacent subset of the visual spectrum (e.g., red & cyan), as defined by broad spectrum dye based color filters, although the viewer perceives a black and white or tinted image. As exemplified by the Color Code system of U.S. Pat. No. 6,687,003 (S. Sorenson et al.), anaglyph glasses have been developed with alternate broad band color filter pairs (e.g., amber and dark blue) that are specified by transmission characteristics to provide both 3D and improved color perception. Likewise, the INFICOLOR approach of US 20100289877 (Lanfranchi et al.) uses a green and magenta color filter pair, using broad band filters from Lee Filters (Andover, UK) or Rosco Laboratories (Stamford, Conn.) to provide anaglyphs with improved color perception.

More recently, the traditional stereo image approach of anaglyph color coding has been extended to electronic displays and cinema. The most common such approach is spectral separation or wavelength multiplex visualization, where the display provides spectral coded output as spectral triplets, R1G1B1 and R2G2B2, and the viewer wears glasses where one eye sees one spectral triplet (R1G1B1) and the other eye sees the second spectral triplet (R2G2B2). This wavelength triplet approach provides an improved sense of color perception, as each eye sees all three colors. Also, wavelength triplet images can be more acceptably viewed as 2D images, as this spectral color coding is subtler than the anaglyphic spatial color coding approach. As one example, U.S. Pat. No. 6,698,890 (H. Jorke) to Daimler Chrysler, provides a color sequential projector (FIG. 4 thereof) having a lamp source and filters, which creates 6 primaries in two sets, alternating R1 G1 B1 and R2 G2 B2 spectra, each primary being 20 nm wide, for stereoscopic viewing using glasses constructed with interference filters. Jorke '890 provides exemplary spectral bandwidths Δλ that are 435-455 nm, 510-530 nm, 600-620 nm, and 460-480 nm, 535-555 nm, 625-645 nm, respectively.

This spectral multiplexing approach, which is generally known as "6P" for use of six primaries, has been further developed. For example, it has been observed that the spectral filters for the projector and glasses of Jorke '890 have steep spectral edges and are hard to fabricate; and particularly in the case of the glasses, the coatings can cause color image artifacts (such as crosstalk) and hue differences. As an improvement, U.S. Pat. No. 7,832,869 (Maximus et al.) provides a stereoscopic projector where color switching enables rapid switching or cycling between left eye and right eye image projection. As another improvement, U.S. Pat. No. 7,784,938, (Richards et al.) to Dolby Laboratories, provides 6P stereo glasses having dichroic interference filters, where the projector filters are pre-blue shifted and the glasses filters have coatings that are formed on curved lenses with improved guard bands and variable thickness coatings, to reduce 3D crosstalk of image content from the target eye to the other eye.

The problem of spectral color shift with angle is inherent to dichroic interference filters. For example, the paper, "Tunable thin-film filters: review and perspectives", by Michel Lequime, SPIE Proc. 5250, pp. 302-311, 2004, provides an equation describing the spectral shift:

$$\lambda_\theta = \lambda_0 (1 - \sin(\theta)^2 / n_{\textit{eff}}^2)^{1/2}$$

In this equation, $\lambda_0$ is the center wavelength of the filter at normal incidence, $\lambda_\theta$ is the center wavelength of the filter at oblique incidence, $\theta$ the angle of incidence of the collimated light beam in air, and $n_{\textit{eff}}$ is the effective index of refraction of the filter. This last quantity depends of the nature of the spacers (high- or low-index) of the elementary Fabry-Perot cavities used in the design of our narrowband thin-film filter and varies with m, the interference order of these cavities and nH and nL, the refractive indices of the quarter-wave alternated layers used for the realization of their high reflectance mirrors. In general, to reduce the wavelength shift for a given angle of incidence in air, the effective index needs to be increased by preferentially using high-index materials and a low interference order. Nonetheless, for angles of incidence above ~30°, coating edges can spectrally shift ($\Delta\lambda_s = \lambda_\theta - \lambda_0$) by 15 nm or more, as illustrated in the spectral graph of FIG. 7A, where a dichroic pass band 393 shifts to shorter wavelengths with increasing angle, becoming shifted dichroic pass bands 394. Such spectral shifts can cause crosstalk problems (<50:1 contrast) if the two spectral channels are separated by a small spectral gap 135, as are the green spectral pair (G1 and G2), which are only 15-20 nm apart. Moreover, as the FOV increases, transmission typically also drops off, from ~80-90% on axis to <30-50% off axis. These transmission and crosstalk variations can cause problem in theatres, and particularly in large screen theaters that support fields of view (FOV) of ±40° or more.

Given these angular problems, and the fact that dichroic glasses have coatings that are formed by thin film deposition in vacuum chambers, it would be desirable to provide 6P glasses by other means. Notably, US Pat. Pub. 20120307358 (M. Baum et al.), suggests that angularly independent color filter bands can be generated by absorption color filters, in a manner similar to anaglyphs. However, the color filters of Baum '358 are portrayed as "cliff functions" with unrealistically straight edges—as evidenced by comparison to the complex filter spectra provided in the previously discussed U.S. Pat. No. 6,687,003 (S. Sorenson et al.) and US 20100289877 (Lanfranchi et al.). Additionally, Baum '358 is vague on how to produce these filters, citing the manner of film production as being sufficient. In conclusion, there is a need for alternative 6P dichroic glasses, preferably being both less costly and having improved performance at larger angles of incidence, than is available from 6P dichroic glasses, or than has been provided thus far by absorptive glasses.

SUMMARY

The following summary is intended to introduce the reader to various aspects of the applicant's teaching, but not to delimit any invention.

Various stereo viewing devices and related methods are disclosed.

According to one aspect, the stereo viewing device comprises a first lens comprising a first lens filter and a second lens comprising a second lens filter. The first lens filter comprises a first set of light absorbing dyes that define a first set of rejection bands. The first set of light absorbing dyes comprises at least a first polymethine dye. The second lens filter comprises a second set of light absorbing dyes that define a second set of rejection bands different from the first set of rejection bands. The second set of light absorbing dyes comprises at least a second polymethine dye.

The first polymethine dye and the second polymethine dye may be selected from the group consisting of cyanine dyes, merocyanine dyes, arylidene dyes, complex cyanine dyes, complex merocyanine dyes, homopolar cyanine dyes, hemicyanine dyes, styryl dyes, hemioxonol dyes, oxonol dyes, and squarylium dyes.

At least one of the first lens filter and the second lens filter further may comprise an additional light absorbing dye selected from the group consisting of anthraquinone dyes, triphenylmethane dyes, azo dyes, azomethine dyes, coumarin dyes, and phthalocyanine dyes.

The first lens may further comprise a first polarization filter that transmits light of a first polarization, and the second lens may further comprise a second polarization filter that transmits light of a second polarization different from the first polarization.

At least one of the light absorbing dyes in at least one of the first or second set of lens filters may be a liquid crystal forming dye. The at least one liquid crystal forming dye may be a J-aggregating dye. The at least one liquid crystal forming dye may be an H-aggregating dye. The liquid crystal forming dye may be embedded in a hydrophilic colloid layer. The hydrophilic colloid layer may comprise a gelatin. The stereo viewing device may comprise at least one layer of a non-liquid crystal forming dye in a hydrophobic binder layer, and may further comprise a first support for the hydrophilic colloid layer and a second support for the hydrophobic binder layer.

The first set of light absorbing dyes may comprise a hydrophobic polymethine dye and a hydrophilic polymethine dye. The first lens may comprise at least one of (i) a space between the hydrophobic polymethine dye and the hydrophilic polymethine dye, (ii) an amphiphilic polymethine dye between the hydrophobic polymethine dye and the hydrophilic polymethine dye (iii) a cross-link between the hydrophobic polymethine dye and the hydrophilic polymethine dye, (iv) a barrier layer between the hydrophobic polymethine dye and the hydrophilic polymethine dye, and (v) a seal between the hydrophobic polymethine dye and the hydrophilic polymethine dye.

The first lens may further comprise at least one quantum dot material providing at least one additional rejection band.

The first set of light absorbing dyes may comprise a first red light absorbing polymethine dye, a first green light absorbing polymethine dye, and a first blue light absorbing polymethine dye, and the second set of light absorbing dyes may comprise a second red light absorbing polymethine dye, a second green light absorbing polymethine dye, and a second blue light absorbing polymethine dye. Each red light absorbing polymethine dye and each green light absorbing polymethine dye may provide greater than or equal to 40:1 spectral contrast for a ratio of pass band light to rejection band light. Each blue light absorbing polymethine dye may provide less than or equal to 20:1 spectral contrast for a ratio of passband light to rejection band light.

The first set of rejection bands and the second set of rejection bands each may include light at wavelengths of between 400 to 500 nm, 500 to 600 nm, and 600 to 700 nm. Each of the light absorbing dyes may provide a spectrally narrow absorption peak in the visible spectrum of 10 to 40 nm.

The first set of rejection bands may be interleaved with the second set of rejection bands. The first set of rejection bands may be non-interleaved with the second set of rejection bands.

At least one of the first polymethine dye and the second polymethine dye may be a cyanine dye of the following formula:

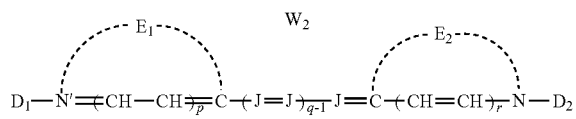

wherein:
$E_1$ and $E_2$ are the same or different and represent the atoms necessary to form a substituted or unsubstituted heterocyclic ring which is a basic nucleus,
J independently represents a substituted or unsubstituted methine group,
q is a positive integer of from 1 to 4,
p and r each independently represents 0 or 1,
$D_1$ and $D_2$ each independently represents substituted or unsubstituted alkyl or substituted or unsubstituted aryl and at least one of $D_1$ and $D_2$ contains an anionic, cationic, or neutral substituent, and $W_2$ is one or more counterions as necessary to balance the charge.

At least one of the first polymethine dye and the second polymethine dye may be a merocyanine dye of the formula:

$$D_3-N-(CH=CH)_p-C=(J-J)_{q-1}G \quad \text{with } E_1, W_2$$

wherein:
- $E_1$ represents the atoms necessary to form a substituted or unsubstituted heterocyclic ring which is a basic nucleus,
- $D_3$ represents substituted or unsubstituted alkyl or substituted or unsubstituted aryl and contains an anion, cationic, or neutral substituent,
- J independently represents a substituted or unsubstituted methine group,
- q is a positive integer of from 1 to 4,
- p independently represents 0 or 1,
- $W_2$ is one or more counterions as necessary to balance the charge, and G represents:

$$\text{(structure with } E_4\text{)} \quad \text{or} \quad \text{(structure with } F, F^1\text{)}$$

wherein:
- $E_4$ represents the atoms necessary to complete a substituted or unsubstituted heterocyclic acidic nucleus,
- F and $F^1$ each independently represents a cyano radical, an ester radical, an acyl radical, a carbamoyl radical, or an alkylsulfonyl radical,
- and $E_4$ represents the atoms necessary to complete a substituted or unsubstituted heterocyclic acidic nucleus.

At least one of the first polymethine dye and the second polymethine dye may be an oxonol dye of the formula:

$$E_5-C=(J-J)_{q-1}-J-E_6 \quad W_2$$

wherein:
- J independently represents a substituted or unsubstituted methine group,
- $W_2$ is one or more counterions as necessary to balance the charge,
- q is 2, 3 or 4,
- and $E_5$ and $E_6$ independently represent the atoms necessary to complete a substituted or unsubstituted acidic heterocyclic nucleus.

At least one of the first set of light absorbing dyes and the second set of light absorbing dyes may comprise a non-polymethine phthalocyanine type dye of the formula:

wherein:
- M represents a metal ion selected from Li, Na, K, Cu, Ag, Be, Mg, Ca, Ba, Zn, Cd, Hg, Al, Sn, Pb, V, Sb, Cr, Mo, Mn, Fe, Co, Ni, Pd, or Pt,
- and $R^{41}$ to $R^{44}$ each independently represent one of hydrogen, alkyl, cycloalkyl, alkenyl, substituted or unsubstituted aryl, heteroaryl, or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, the atoms required to form fused aromatic or heteroaromatic rings, and solubilizing groups.

The first lens filter may further comprise a dichroic filter lens portion, and the first polymethine dye may be provided at least on an edge of the first lens filter to selectively absorb at least a portion of the leakage light allowed through the dichroic filter lens portion.

According to another aspect, a stereo viewing device comprises a first lens and a second lens. The first lens comprises (i) a first lens filter, and (ii) a first polarization filter of a first polarization state. The first lens filter comprises a first set of light absorbing dyes that define a first set of rejection bands. The first set of light absorbing dyes comprises at least a first polymethine dye. The second lens comprises (i) a second lens filter, and (ii) a second polarization filter of a second polarization state different from the first polarization state. The second lens filter comprises a second set of light absorbing dyes that define a second set of rejection bands different from the first set of rejection bands. The second set of light absorbing dyes comprises at least a second polymethine dye.

The effective spectral contrast of the first lens to the second lens may be greater than or equal to 100:1.

The first polarization filter and the second polarization filter may be selected from the group consisting of linear polarizers and circular polarizers.

At least one of the first polymethine dye and the second polymethine dye may be a J-aggregating dye.

According to another aspect, a stereo viewing device comprises a first lens comprising a first lens filter, and a second lens comprising a second lens filter. The first lens filter comprises a first set of light absorbing dyes that define a first set of rejection bands. The second lens filter comprises a second set of light absorbing dyes that define a second set of rejection bands. The first set of light absorbing dyes comprises at least one hydrophobic light absorbing dye, and at least one hydrophilic light absorbing dye.

At least one of the hydrophobic light absorbing dye and the hydrophilic light absorbing dyes may be a polymethine dye. At least one of the hydrophobic light absorbing dye and the hydrophilic light absorbing polymethine dye may be a J-aggregating dye.

The hydrophobic light absorbing dye may be cross-linked to the hydrophilic light absorbing dye. The hydrophobic light absorbing dye may be spaced apart from the hydrophilic light absorbing dye.

The first set of light absorbing dyes may comprise at least one amphiphilic light absorbing dye between the hydrophobic light absorbing dye and the hydrophilic light absorbing dye.

The stereo viewing device may further comprise at least one of a barrier layer and a seal between the hydrophobic light absorbing dye and the hydrophilic light absorbing dye.

According to another aspect, a stereo viewing device comprises a first lens comprising a first lens filter, and a second lens comprising a second lens filter. The first lens filter comprises a first set of light absorbing dyes that define a first set of rejection bands. The second lens filter comprises a second set of light absorbing dyes that define a second set of rejection bands different from the first set of rejection bands. At least one of the first set of light absorbing dyes and the second set of light absorbing dyes comprises a J-aggregating dye. The J-aggregating dye is embedded in a hydrophilic colloid layer.

The J-aggregating dye may be a polymethine dye. The polymethine dye may be selected from the group consisting of cyanine dyes, merocyanine dyes, arylidene dyes, complex cyanine dyes, complex merocyanine dyes, homopolar cyanine dyes, hemicyanine dyes, styryl dyes, hemioxonol dyes, oxonol dyes, and squarylium dyes.

The J-aggregating dye may be a non-polymethine dye selected from the group consisting of anthraquinone dyes, triphenylmethane dyes, azo dyes, azomethine dyes, coumarin dyes, and phthalocyanine dyes.

The J-aggregating dye may be a cyanine dye of the formula:

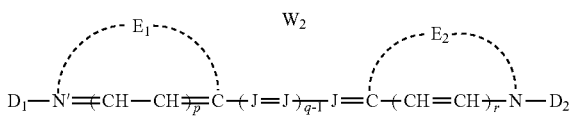

wherein:

$E_1$ and $E_2$ are the same or different and represent the atoms necessary to form a substituted or unsubstituted heterocyclic ring which is a basic nucleus, J independently represents a substituted or unsubstituted methine group, q is a positive integer of from 1 to 4, p and r each independently represents 0 or 1, $D_1$ and $D_2$ each independently represents substituted or unsubstituted alkyl or substituted or unsubstituted aryl and at least one of $D_1$ and $D_2$ contains an anionic, cationic, or neutral substituent, and $W_2$ is one or more counterions as necessary to balance the charge.

The J-aggregating dye may be a merocyanine dye of the formula:

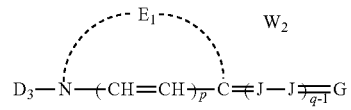

wherein:

$E_1$ represents the atoms necessary to form a substituted or unsubstituted heterocyclic ring which is a basic nucleus, $D_3$ represents substituted or unsubstituted alkyl or substituted or unsubstituted aryl and contains an anion, cationic, or neutral substituent, J independently represents a substituted or unsubstituted methine group, q is a positive integer of from 1 to 4, p independently represents 0 or 1, $W_2$ is one or more counterions as necessary to balance the charge, and G represents:

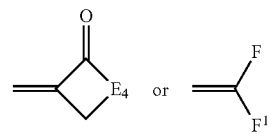

wherein:

$E_4$ represents the atoms necessary to complete a substituted or unsubstituted heterocyclic acidic nucleus, F and $F^1$ each independently represents a cyano radical, an ester radical, an acyl radical, a carbamoyl radical, or an alkylsulfonyl radical, and $E_4$ represents the atoms necessary to complete a substituted or unsubstituted heterocyclic acidic nucleus.

The J-aggregating dye may be an oxonol type dye of the formula:

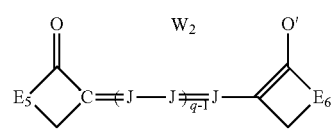

wherein:

J independently represents a substituted or unsubstituted methine group, $W_2$ is one or more counterions as necessary to balance the charge, q is 2, 3 or 4, and $E_5$ and $E_6$ independently represent the atoms necessary to complete a substituted or unsubstituted acidic heterocyclic nucleus.

The J-aggregating dye may be a phthalocyanine type dye of the formula:

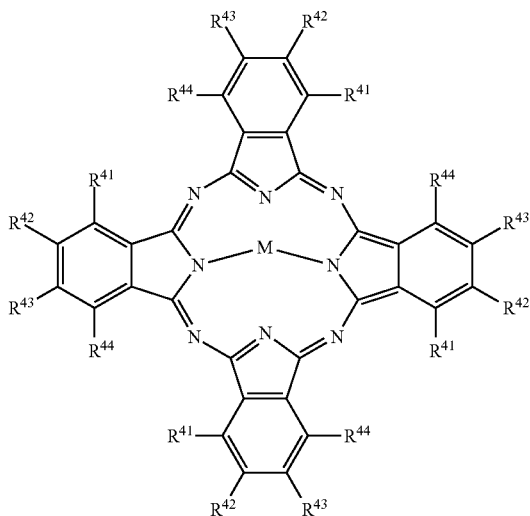

wherein:
M represents a metal ion selected from Li, Na, K, Cu, Ag, Be, Mg, Ca, Ba, Zn, Cd, Hg, Al, Sn, Pb, V, Sb, Cr, Mo, Mn, Fe, Co, Ni, Pd, or Pt,
and $R^{41}$ to $R^{44}$ each independently represent one of hydrogen, alkyl, cycloalkyl, alkenyl, substituted or unsubstituted aryl, heteroaryl, or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, the atoms required to form fused aromatic or heteroaromatic rings, and solubilizing groups.

According to another aspect, a method of stereo image separation is disclosed. The method comprises a) projecting image light of a first set of colors and image light of a second set of colors; b) transmitting the image light of the first set of colors through a first lens; c) absorbing the image light of the second set of colors with a first set of light absorbing dyes provided in the first lens to inhibit transmission of image light of the second set of colors through the first lens, the first set of light absorbing dyes comprising at least a first polymethine dye; d) transmitting the image light of the second set of colors through a second lens; and e) absorbing the image light of the first set of colors with a second set of light absorbing dyes provided in the second lens to inhibit transmission of the image light of the first set of colors through the second lens, the second set of light absorbing dyes comprising at least a second polymethine dye.

At least one of the first polymethine dye and the second polymethine dye may be selected from the group consisting of cyanine dyes, merocyanine dyes, arylidene dyes, complex cyanine dyes, complex merocyanine dyes, homopolar cyanine dyes, hemicyanine dyes, styryl dyes, hemioxonol dyes, oxonol dyes, and squarylium dyes.

At least one of the first set of light absorbing dyes and the second set of light absorbing dyes may further comprise at least one non-polymethine dye selected from the group consisting of anthraquinone dyes, triphenylmethane dyes, azo dyes, azomethine dyes, coumarin dyes, and phthalocyanine dyes.

At least one of the first polymethine dye and the second polymethine dye may be a J-aggregating dye. The J-aggregating dye may be embedded in a hydrophilic colloid layer.

The first set of light absorbing dyes may comprise a hydrophobic polymethine dye and a hydrophilic polymethine dye, and the first lens may comprise at least one of (i) a space between the hydrophobic polymethine dye and the hydrophilic polymethine dye, (ii) an amphiphilic polymethine dye between the hydrophobic polymethine dye and the hydrophilic polymethine dye (iii) a cross-link between the hydrophobic polymethine dye and the hydrophilic polymethine dye, (iv) a barrier layer between the hydrophobic polymethine dye and the hydrophilic polymethine dye (v) and a seal between the hydrophobic polymethine dye and the hydrophilic polymethine dye.

According to another aspect, a method for making a stereo viewing device is disclosed. The method comprises a) coating a first set of light absorbing polymethine dyes on a first substrate to form a first lens. The first set of light absorbing polymethine dyes absorbs light of a first set of colors. The method further comprises b) coating a second set of light absorbing polymethine dyes on a second substrate to form a second lens. The second set of light absorbing polymethine dyes absorbs light of a second set of colors.

The first set of light absorbing polymethine dyes and the second set of light absorbing polymethine dyes may be selected from the group consisting of cyanine dyes, merocyanine dyes, arylidene dyes, complex cyanine dyes, complex merocyanine dyes, homopolar cyanine dyes, hemicyanine dyes, styryl dyes, hemioxonol dyes, oxonol dyes, and squarylium dyes.

Step a) may comprise dispersing at least one light absorbing dye of the first set of light absorbing dyes in a hydrophilic colloid layer.

The first set of polymethine light absorbing dyes may comprise a hydrophilic light absorbing dye and a hydrophobic light absorbing dye, and the method may comprise spacing the hydrophobic light absorbing dye from the hydrophilic light absorbing dye.

The first set of polymethine light absorbing dyes may comprise a hydrophilic light absorbing dye and a hydrophobic light absorbing dye, and the method may comprise coating at least one amphiphilic light absorbing dye between the hydrophobic light absorbing dye and the hydrophilic light absorbing dye.

The first set of polymethine light absorbing dyes may comprise a hydrophilic light absorbing dye and a hydrophobic light absorbing dye, and the method may comprise providing a barrier layer between the hydrophobic light absorbing dye and the hydrophilic light absorbing dye.

The first set of polymethine light absorbing dyes may comprise a hydrophilic light absorbing dye and a hydrophobic light absorbing dye, and the method may comprise providing a seal between the hydrophobic light absorbing dye and the hydrophilic light absorbing dye.

The first set of polymethine light absorbing dyes may comprise a hydrophilic light absorbing dye and a hydrophobic light absorbing dye, and the method may comprise cross-linking the hydrophobic light absorbing dye to the hydrophilic light absorbing dye.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIGS. 6A and 6B depict transmission spectra for example absorber dyes;

FIG. 6E is a table showing the resulting spectral transmission and spectral extinction, averaged over the various spectral bands, for lens filters that use the absorber dye sets of FIG. 6C.

FIG. 6F is a table showing the resulting spectral transmission and spectral extinction, averaged over the various spectral bands, for the same dyes as FIGS. 6A and 6B, but with the dye densities for this configuration of visible light absorbing filters reduced as compared to FIG. 6C:

FIG. 6G is a table showing the resulting spectral transmission and spectral extinction, averaged over that various spectral bands, where the green and red dyes are coated to provide dye densities that nominally favor contrast over transmission, while blue dyes are coated to provide dye densities that nominally favor transmission over contrast, but wothout the use of a polarizer:

DETAILED DESCRIPTION

Various apparatuses or processes will be described below to provide an example of an embodiment of each claimed invention. No embodiment described below limits any claimed invention and any claimed invention can cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

In some cases, components that normally lie in the optical path of the projection apparatus are not shown, in order to describe the operation of projection optics more clearly.

Figure 1:
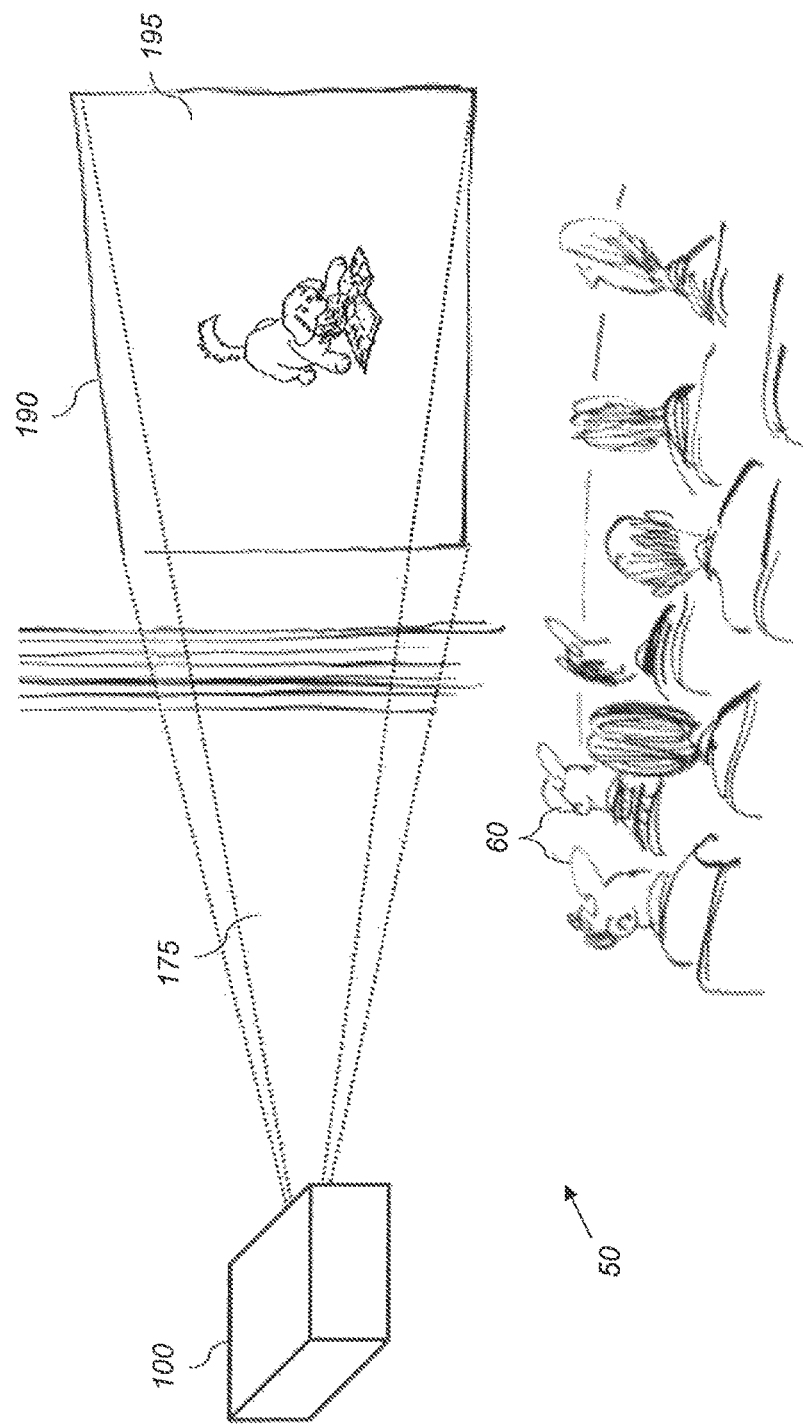
FIG. 1 is a schematic view of an audience of observers viewing an image projected by a prior art projector.

As shown in FIG. 1 by way of example, an audience of observers 60 in a theater 50 views an image 195 formed with image light 175 from projector 100 that is imaged onto a display surface 190. The projected image typically includes a 2-D array of image pixels (not shown), each having a specified color and luminance for a frame time. Projector 100 uses three narrow-bandwidth spectral primaries which can use lasers (including fiber lasers), LEDs, super-luminescent diodes (SLEDs), quantum dot enhanced light sources, or other narrow-band light sources. As used herein, narrow-band light sources are considered to be light sources having full-width half-maximum (FWHM) spectral bandwidths of not more than ~30 nm and preferably only 5-10 nm, and maybe as little as 0.1-3 nm.

Figure 2:
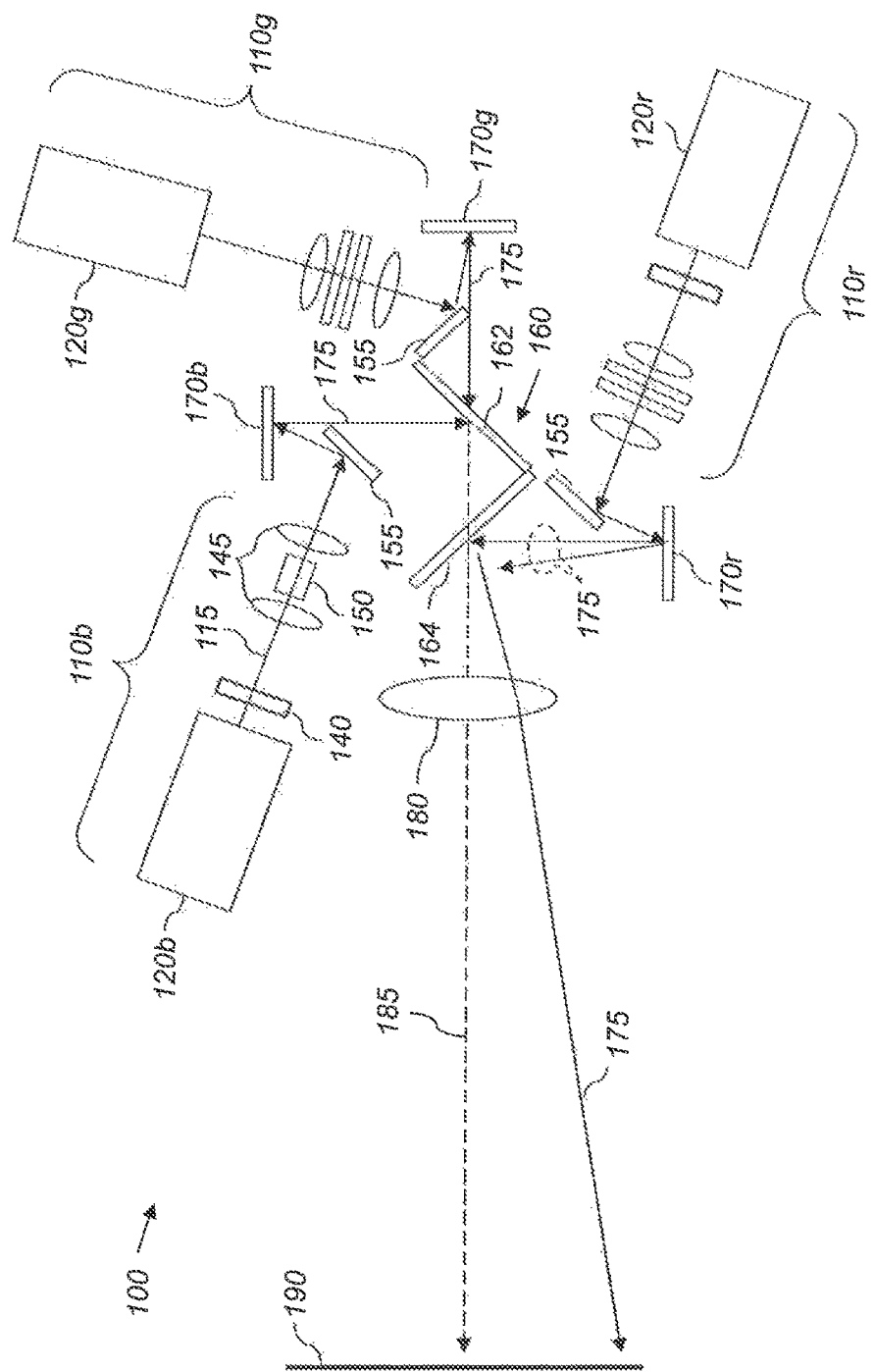
FIG. 2 is a schematic view of a prior art optical system for a laser projector.

The schematic diagram of FIG. 2 shows an example arrangement for a projector 100 having three narrow-band primaries ($\lambda_b$, $\lambda_g$, $\lambda_r$). Red, green and blue illumination assemblies 110r, 110g and 110b are shown, providing red, green and blue (RGB) primary colors from respective red, green and blue laser light sources 120r, 120g and 120b. This system is similar to that described in the aforementioned Silverstein et al. paper. Each of the red, green and blue laser light sources 120r, 120g and 120b can include one or more light source devices, which are typically multi-emitter laser array devices. For example, the red laser light source 120r can include multiple (for example 12) semiconductor laser arrays, which are assembled to provide a narrow-band primary ($\lambda_r$) for a red color channel. In some embodiments, the red laser light source 120r can use multiple Mitsubishi ML5CP50 laser diodes, each emitting ~6 Watts of optical flux at ~638 nm from an array of 12 laser emitters. Similarly, the green laser light source 120g and the blue laser light source 120b can each include a plurality of laser devices. For example, in some embodiments, the green laser light source 120g can use a NECSEL-532-3000 green visible array package that nominally emits 3-4 Watts of 532 nm light in 48 beams, distributed as 24 beams from each of two rows of beams. Similarly, in some embodiments, the blue laser light source 120b can use a NECSEL-465-3000 blue visible array package that nominally emits 3-4 Watts of 465 nm light, also in 48 beams, distributed as 24 beams from each of two rows of beams. In each case, the respective laser light source assemblies can include lenses, mirrors, prisms, or other components (not shown) to provide laser beam shaping and directional control to fashion an array of emergent beams that exit an aperture of a housing, as input into the rest of the illumination system.

The plurality of lasers from a laser light source 120 have a bandwidth. In particular, the width of a wavelength band of an individual laser is characterized by a bandwidth $\Delta\lambda_1$ (e.g., the full-width half (FWHM) maximum bandwidth), where typical laser bandwidths $\Delta\lambda_1$ from individual lasers used in laser projectors are in the range of 0.05-1.5 nm. Then the plurality of N lasers in a laser light source 120 have an aggregate bandwidth $\Delta\lambda_{group}$ which is larger than an individual laser bandwidth, and typically $\Delta\lambda_{group}$=4-12 nm FWHM bandwidth, depending on the lasers used. These aggregate bandwidths can be provided by each of the laser light sources 120 for Red (R1 or R2), green (G1 or G2), or Blue (B1 or B2). Image light then produced by the projector with these light spectra must be selectively transmitted or blocked by the lens filters 335 (see FIGS. 4A,B) of stereo viewing glasses 300 (see FIG. 3) to create the desired stereo perception effect. Should a light source bandwidth and lens filter blocking bandwidth be mismatched, then leakage will occur, degrading both contrast and stereo perception.

This type of arrangement of six laser primaries creates a series of spectral gaps. The spectral gaps between color pairs (B2 to G1) and (G2 to R1) can be relatively large (e.g., 60-80 nm), while the spectral gaps between two spectral channels or color pairs (e.g., B1 and B2, or G1 and G2) can be much smaller (e.g., 12-20 nm apart). In creating 6P stereo glasses, these small spectral gaps 135 between the long wavelength of the short wavelength primary and the short wavelength of the long wavelength primary (see FIG. 7A) may present a constraint. In the case of 6P dichroic spectral filters, the dichroic pass bands 393 can have spectral edges that fit in these spectral gaps 135, but spectral shifts with angle or FOV may be problematic. In the case of 6P light absorbing dye based filters, such small spectral gaps 135 can cause greater trouble if the dye is working on the short wavelength (hypsochromic) side of peak absorbance than when on the long wavelength (bathochromic) side.

At present, the power levels needed for digital cinema can be accomplished cost effectively by optically combining the output of multiple laser arrays in each color channel, using free space optics or fiber coupling, to provide a system such as that of FIG. 2. Eventually, laser technology may advance such that a few, modest cost, compact laser devices can drive each color. Fiber lasers may also be developed that are appropriate for this application. In a given color channel, the light beams emerging from a laser light source assembly can encounter further portions of the respective red, green and blue illumination assemblies 110r, 110g and 110b, which can include various illumination lenses 145, a light integrator 150, one or more mirrors 155, and other illumination optics 140 such as filters, polarization analyzers, wave plates, apertures, or other elements as required. A polarization switching device (not shown), or other optics, to enable 3D projection, can also be included with the projector.

As then shown in FIG. 2, illumination light 115 from the light source assemblies are directed onto respective spatial light modulators 170 by redirection with one or more mirrors 155. Spatial light modulators 170 and combiner 160 (such as a dichroic combiner) are aligned along an optical axis 185 of imaging optics 180. Modulated image light 175, bearing image data imparted into the transiting light by the addressed pixels of the spatial light modulators 170, is combined using the combiner 160, and then directed through imaging optics 180 to display surface 190 (such as a projection screen). The display surface 190 can for example be a white matte screen that approximates a Lambertian diffuser, or a gain screen that back reflects light in a narrower cone (e.g., with a gain of g ~2.4). Gained screens can be curved, fabricated with complex surface structures, can maintain polarization to aid 3-D projection, and have a white or neutral (slightly gray) spectral reflectance. In the illustrated embodiment, the combiner 160 comprises a first combiner 162 and a second combiner 164, each of which is a dichroic element or filter having appropriate thin film optical coatings that selectively transmits or reflects light according to its wavelength.

In some examples, mirrors 155 may not lie in the plane of the optical system. Thus the mirror 155 in the optical path for the green channel can be out of plane, and not obstructing image light 175 passing to imaging optics 180, as might be otherwise implied by FIG. 2. Additionally, while combiner 160 is shown as a pair of tilted glass plates, other constructions can be used, including X-prisms, V-prisms, or Philips (or Plumbicon) type prisms. In other embodiments, mirrors 155 can also be provided in the form of prisms, such as the widely used TIR (total internal reflection) prism that is often used in combination with the Philips prism and DLP devices.

In FIG. 2, the imaging optics 180 are depicted symbolically by a single lens element. In practice, the imaging optics 180 can be a multi-element assembly comprising multiple lens elements that directs and focuses image light 175 such that it images spatial light modulators 170 at their respective object planes to an image plane (display surface 190) at high magnification (typically 100×-400×). Imaging optics 180 can be fixed focus or zooming optics, and can wholly include transmissive elements (e.g., lenses) or reflective elements (e.g., imaging mirrors), or can be catadioptric, including both transmissive and reflective elements. The imaging optics 180 can include projection optics (e.g., a projection lens including a plurality of lens elements) that form an image of the modulators onto the screen. In some embodiments, imaging optics 180 can also include relay optics (e.g., a relay lens including a plurality of lens elements) that creates a real aerial image at an intermediate image plane, which is then subsequently imaged to the screen by the projection optics. In some embodiments, a de-speckling device, to reduce the visibility of laser speckle, can be provided in the optical path. In some configurations, it is advantageous to locate the de-speckling device at or near the intermediate image plane.

In some embodiments, the spatial light modulators 170 of projector 100 are Digital Light Processor (DLP) or Digital Micro-mirror Devices (DMDs), developed by Texas Instruments, Inc., Dallas, Tex. The DLP device uses pulse width modulation (PWM) control of the pixels or micro-mirrors to impart image data information to the transiting light. However, in other embodiments, other technologies can also be used for the spatial light modulators 170, including transmissive liquid crystal displays (LCDs) or reflective liquid crystal on silicon (LCOS) devices, which typically alter polarization states of the transiting light to impart the image data information therein.

Figure 3:
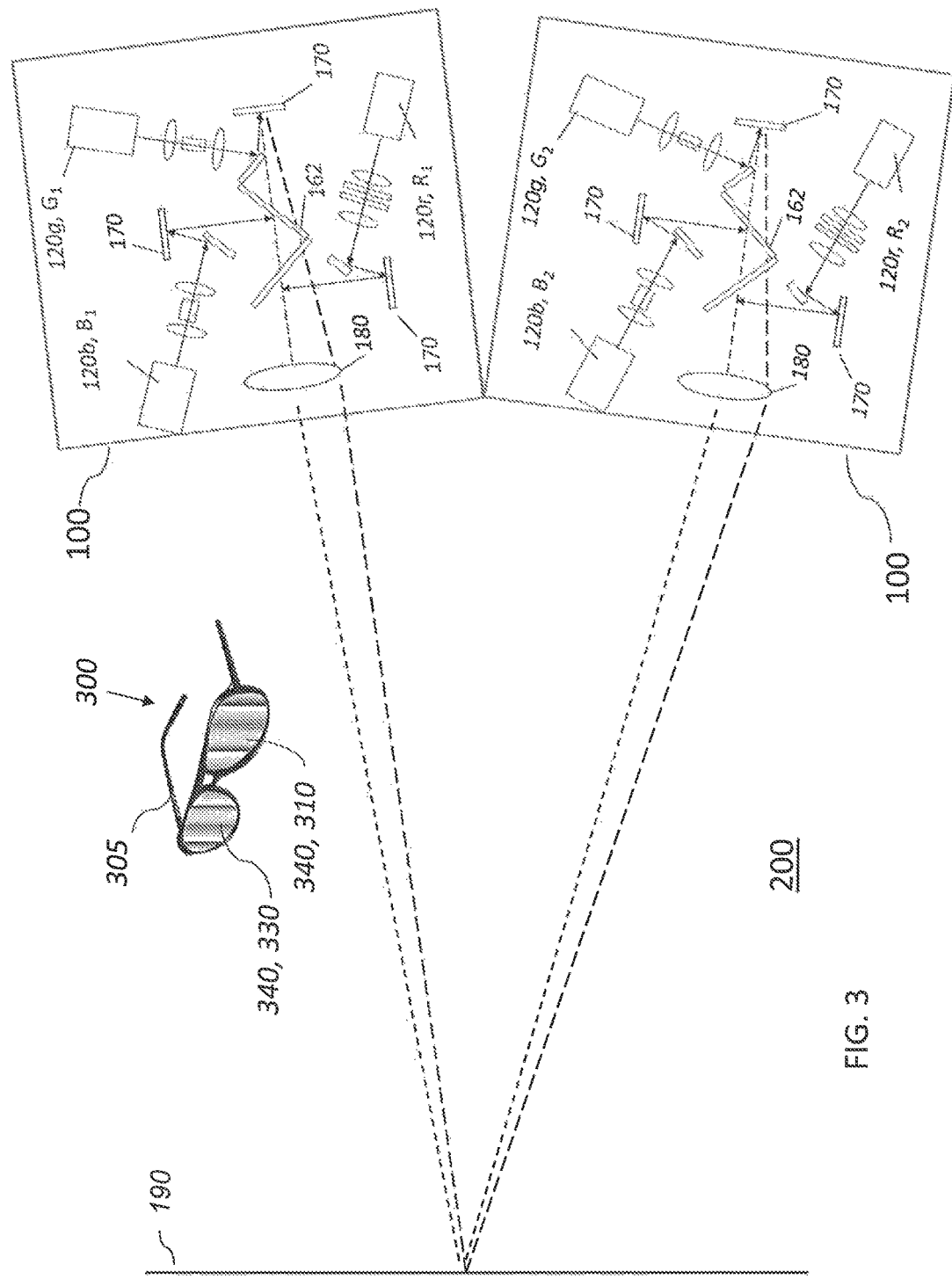
FIG. 3 is a schematic view of an example 6P projection system.

In some embodiments, image light can be projected on the screen 190 with six primaries. Image light can originate from one projector 100 in a time sequential manner, where each color channel produces two wavelength bandwidths (e.g., green G1 having a central wavelength $\lambda_{g1}$ and bandwidth $\Delta\lambda_{g1}$ and green G2 having a central wavelength $\lambda_{g2}$ and bandwidth $\Delta\lambda_{g2}$) in a time sequential manner. Alternatively or additionally, a single projector 100 can have six spatial light modulators 170 instead of three, including two red, green, and blue respectively, to provide spectral wavelength sets R1G1B1 and R2G2B2. Alternatively or additionally, and as shown in FIG. 3, a stereo projection system 200 can include two projectors 100, each providing a spectral wavelength set or triplet (R1G1B1 or R2G2B2 respectively) of color primaries. For example, a first projector 100 can display with a set of three nominal laser emission wavelengths (λ), each having a bandwidth (Δλ), at 445 nm, 532 nm, and 635 nm, while the second projector 100 then displays images using a second set at 465 nm, 550 nm, and 660 nm.

FIG. 3 also shows a pair of stereo viewing glasses 300, or spectral separation glasses 300, which are an example of a stereo viewing device. The stereo viewing glasses 300 have a pair of lenses 340. The lenses 340 include a left eye lens 310 (also referred to as a first lens) and a right eye lens 330 (also referred to as a second lens), which are mounted in frames 305. The left eye lens 310 and right eye lens 330 each include a lens filter 335 formed on or within a substrate 350, as will be discussed in subsequent detail. Each of the left eye lens 310 and right eye lens 330 can also be referred to herein as a light filtering lens. Each lens filter 335 includes a set of light absorbing filters. Each light absorbing filter defines at least one visible light absorbing rejection band. The rejection bands of each lens filter collectively define a series of visible light transmitting pass bands. The term 'rejection band' refers to a range of wavelengths of light that are, to a greater extent than adjacent wavelengths, absorbed by the filter, and the term 'pass band' refers to a range of wavelengths of light that, to a greater extent than other wavelengths, pass through, or are transmitted by, the filter. The rejection bands of the right eye lens are different from the rejection bands of the left eye lens, so that each eye sees a different set of colors. Each set of rejection bands can include light at wavelengths of between 400 and 500 nm, between 500 and 600 nm, and between 600 and 700 nm.

Stereo projection system 200, using laser light generating six distinct colors, can produce 3D images when viewed by an observer 60 wearing stereo viewing glasses 300 that use specific absorber dyes (also referred to herein as light absorbing dyes) to form the visible light absorbing filters. The left eye image would be viewed through a first set of light absorbing dyes or absorber dyes (i.e. through one lens filter 335) absorbing one set of laser light emitted wavelengths, and the right eye image would be viewed through a second set of absorber dyes (i.e. through another lens filter 335) absorbing a different set of laser light emitted wavelengths.

In some embodiments, the absorber dyes that absorb laser light for the left eye image content generally do not absorb laser light intended for the right eye image content, and vice versa. This can be achieved, for example, by using six absorber dyes: three absorber dyes each in the left and right eye lenses. Individual absorber dyes can be selected to maximally absorb light at each of the projection laser light output wavelengths. Further, the three absorber dyes can each absorb light in a very narrow wavelength range. Each of the absorber dyes can be described as having high optical density (O.D.), a spectral absorption peak, and narrow full width at half maximum (FWHM) (also known as half band width). In some examples light absorbing dyes with spectrally narrow absorbance peaks of ≥40 nm half bandwidth may be used. In some examples, light absorbing dyes with spectrally narrow absorbance peaks of ≥30 nm may be used. In some examples, light absorbing dyes with spectrally narrow absorbance peaks of ≥20 nm can be used. In some particular examples, dyes with <10 nm half bandwidths may be avoided, as the aggregate spectral bandwidths from light sources 120 are $\Delta\lambda_{group}$=4-12 nm, and the risks relative to the repeatability of dye spectra and light leakage both increase. Thus, in certain examples, the light absorbing dyes may have spectrally narrow dye absorption peaks, with dye density spectra half bandwidths in a range of 10-40 nm.

For example, one set of six laser emission wavelengths (λ) can be 445 nm, 465 nm, 532 nm, 550 nm, 635 nm, and 660 nm, each having a center wavelength and bandwidth (Δλ). When those rejection bands are interleaved between the left eye and right eye image content then, for example, the left eye lens would absorb 445 nm, 532 nm, and 635 nm wavelengths, and the right eye lens would absorb 465 nm, 550 nm, and 660 nm wavelengths. When those rejection bands are non-interleaved between the left eye and right eye image content then, for example, the left eye lens would absorb 465 nm, 532 nm, and 635 nm wavelengths, and the right eye lens would absorb 445 nm, 550 nm, and 660 nm wavelengths. Other non-interleaved rejection bands or partially interleaved rejection bands are also possible. It is also possible to design laser emitting light sources which would emit light at wavelengths different than the wavelengths described above. For example, one such different set of wavelengths could be 415 nm, 465 nm, 515 nm, 550 nm, 615 nm and 660 nm. These can be employed in interleaved or non-interleaved sets. The left eye lens and right eye lens designations are not necessarily immutable, as a system (projector and glasses) can in some examples be designed equivalently with the short wavelengths going to either the left or right eye, and the long wavelengths then going to the other eye.

With respect to stereo glasses 300, when using a plurality of absorber dyes to absorb laser emission wavelengths, the transmission at each wavelength for the appropriate left or right eye lens filter can in some examples exceed 60% transmission, and in further examples exceed 85% transmission. Also, extinction for that filter of the opposite eye wavelengths, expressed as a ratio (3D contrast or spectral contrast) can in some examples be greater than 50 to 1, in further examples be greater than 100 to 1, and in further examples be greater than 200:1. In some embodiments, dye sets will be provided that approach or fulfill these targets. In general, in some embodiments, the performance of lens filters will vary little with changing incidence angle. In some embodiments, the lens filters provide transmission and extinction uniformities that eliminate, limit, minimize, or reduce crosstalk, that eliminate, limit, minimize, or reduce ghosting, and keep image signal from fading away, also known as low transmission. In some embodiments, the field of view is 32°, and in further embodiments is greater than or equal to 42°, for some theaters.

Figure 4:
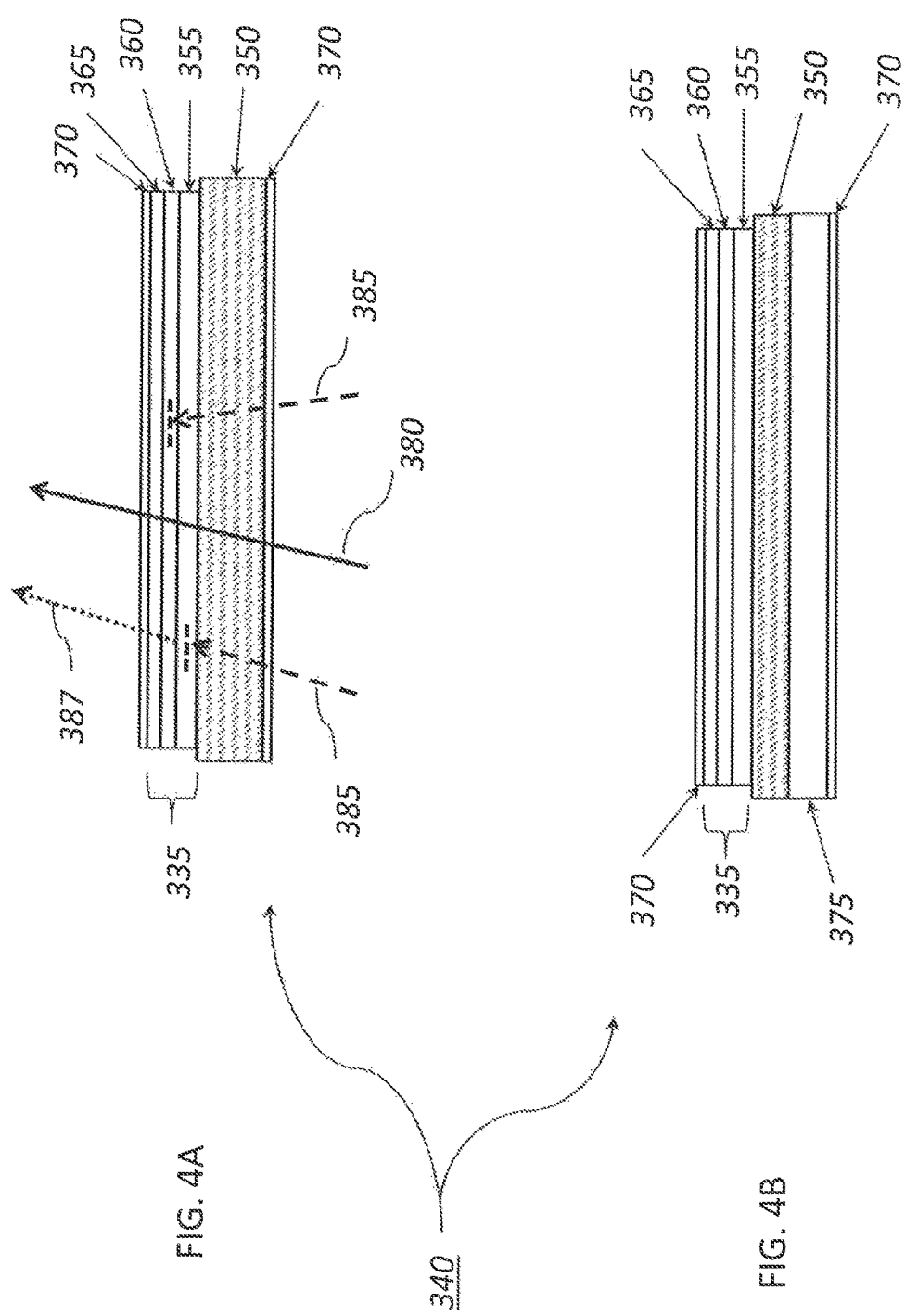
FIG. 4A is a cross-sectional view of an example lens.
FIG. 4B is a cross-sectional view of another example lens.

Each light absorbing filter can include at least one of a red light absorbing dye, a green light absorbing dye, and a blue light absorbing dye. FIG. 4A depicts a cross-sectional view of a light filtering lens 340 of the stereo glasses 300, in which the lens filter 335 includes red filter 355, green filter 360, and blue filter 365, and is formed on a substrate 350. The light filtering lens 340 can be the left eye lens 310 or right eye lens 330. Each of the filters, which can be provided in a different order on the substrate 350, includes one or more absorber dyes, for example in the form of a coating, which absorbs visible light. In the case that transiting light 380 has a spectrum that substantially corresponds to where these filters (355, 360, and 365) are nominally transmissive, than a significant portion of that incident light transits the structure of the light filtering lens 340. In an alternate case, where incident light has a spectrum that substantially corresponds to where these filters (355, 360, and 365) are absorptive, than as the light encounters the filters, a significant portion of that incident light becomes blocked light 385 that is absorbed in the structure of the lens filter 340. Residual transiting light 380 that does not become blocked light 385 and leaks through a rejection band 390 (see FIGS. 6A,B) or an angularly shifted pass band 392 of a lens filter 335, then becomes leakage light 387 that can reduce stereo contrast.

The absorber dyes can be comingled or co-coated to provide at least two filters (355, 360, or 365) in one layer instead of in two discrete layers as shown in FIG. 4A. Although FIG. 4A shows the light filtering lens 340 as a planar structure, the substrate and filters can be provided with curvature, as is customary with eye glasses or sun glasses. For example, light filtering lens 340 can be fabricated with a substrate 350 having a nominal radius of curvature of 90 mm. Advantageously, compared to spectral separation stereo glasses with dichroic filters, the radius can be increased (e.g. 120 mm) to reduce cost without shrinking the spectrally filtered field of view. Light filtering lens 340 can also be provided with optional anti-reflecting coatings 370 (AR coatings) on one or both outer surfaces, so as to improve the transmission of the overall lens. Anti-reflection coatings 370 can be provided by evaporative deposition or as a laminated film (e.g., Nitto Denko America, Fremont Calif., or Eyesaver International, Hanover Mass.).

In another embodiment, a hybrid light absorbing system for laser light emission wavelengths is provided. For example, each light filtering lens can include both dyes for absorbance and polarizers (also referred to as polarization filters) for light selection. The left eye lens can include a first polarization filter of a first polarization state, and the right eye lens can include a second polarization filter of a second polarization state. As shown in FIG. 4B, the light filtering lens 340 also includes an optical polarizer 375. The polarizer can modify polarized incident light in accord with a polarization alignment thereof relative to the polarization filter. Such a hybrid approach can have transmission at each wavelength of the appropriate light filtering lens 340 that is greater than 60% or greater than 80%, and extinction or contrast of that filter for the opposite eye wavelengths can be greater than 50:1.

In some embodiments, absorber dyes can have high optical density at the laser emission wavelengths $\lambda$ and full width at half maximum of absorption of 20 nm or less, with very little shorter wavelength absorbance. In other embodiments, absorber dyes may have spectral absorbance bands with full width at half maximum of greater than 30 nm and also possess large absorbance bands at wavelengths shorter than the absorbance maximum.

Characteristic spectral properties of dyes are reported in many journal articles including:

"Cyanines during the 1990s: A Review", A. Mishra, R. K. Behera, P. K. Behera, B. K. Mishra, G. B. Behera; Chem. Rev. 2000, 100, pp. 1973-2011.

"Squarylium Dyes and Related Compounds", S. Yagi, H. Nakazumi; Topics in Heterocyclic Chemistry (2008), 14: 133-181.

"Relationship between the Molecular Structure of Cyanine Dyes and the Vibrational Fine Structure of their Electronic Absorption Spectra", H. Mustroph, K. Reiner, J. Mistol, S. Ernst, D. Keil, L. Hennig; ChemPhysChem 2009, 10, pp. 835-840.

Dyes such as those described in the above journal articles may be very useful for applications such as colorants for paints, plastics, fabrics, and electronic information recording, or may be useful in printed images including those arising from inks and photographic technology. However, such dyes and colorants with broad absorbance bands, rather than narrow absorbance bands, may be unsuitable for use in the preparation of the 3D stereo glasses 300 for laser light emission projection systems.

Multiple coatings of dyes on non-birefringent substrates 350 may be employed for the preparation of some types of stereo glasses 300. It has been determined that the coatings of some dyes in aqueous binder, and the coating of other dyes in non-aqueous binder in separate layers, can in some examples provide superior lens structure for 3D stereo glasses for laser light emission projection systems. In particular, it has been determined that polymethine dyes, and particularly liquid crystal forming polymethine dyes, can in some embodiments provide the properties of very high optical density and very narrow full width at half maximum, which can enable the preparation of stereo glasses 300 for laser-based stereo projection systems 200 with the properties of excellent wavelength discrimination, high light transmission, and low ghosting. In some particular embodiments, polymethine dyes which form lyotropic liquid crystalline mesophases and afford light absorbance characteristics of very high optical density and very narrow full width at half maximum can be employed. Polymethines are compounds made up from an odd number of methine groups (CH) bound together by alternating single and double bonds. Polymethine dyes are organic compounds characterized by a resonance structure containing a chain composed of an odd number of methine groups, =CH—, with conjugated double bonds; general formula, X (CH=CH)nCH=Y, where X and Y are groups containing atoms of N, O, or S, and n=1-5. Some of the methine groups may form heterocycles or aromatic residues. The polymethine class of dyes includes cyanines, merocyanines, and oxonol dyes, amongst others. Polymethine dyes can be fast (fade resistant) and have bright and rich colors.

Dyes are absorption colorants. Unlike pigments which are macro-particulate and scatter light as well as absorbing it, dyes can be soluble, molecular size particles, and perceived color results purely from visible light absorbance. The vast majority of organic dyes contain an extended conjugated chromophore to which are attached electron donor and electron acceptor groups. Light energy absorbance results in electronic transitions between molecular orbitals of the chromophore portion of the organic molecule. Dyes with multiple electronic transitions, at lower and higher energies, will display broad absorbance spectra.

Absorbance of light at longer wavelengths (lower energy) is defined as bathochromic absorbance, and absorbance at shorter wavelengths (higher energy light) is defined as hypsochromic absorbance. The color of a dye in solution is dependent upon the physical properties of the solvent. For example, the absorbance maximum of a particular dye dissolved in methanol may be bathochromic of the same dye dissolved in hexane. It is generally true that dyes will display longer absorbance in hydrophilic solvents and shorter absorbance in hydrophobic solvents.

Dyes of the polymethine type are may be further described as cyanine dyes, merocyanine dyes, arylidene dyes, complex cyanine dyes, complex merocyanine dyes, homopolar cyanine dyes, hemicyanine dyes, styryl dyes, hemioxonol dyes, oxonol dyes, and squarylium dyes. Other types of colorants, such as anthraquinone dyes, triphenylmethane dyes, azo dyes, azomethine dyes, phthalocyanine dyes, and coumarin dyes, which are non-polymethine dyes, may also be used, either alone or in combination with the polymethine dyes.

In some examples, at least one of the light absorbing dyes is a J-aggregating dye, which is a type of dye with an absorption band that shifts to a longer wavelength (bathochromic shift) of increasing sharpness (higher absorption coefficient) when it aggregates under the influence of a solvent or additive or concentration as a result of supramolecular self-organization. A J-aggregating dye is a type of liquid crystal forming dye, which can be embedded in a hydrophilic colloid layer, where the hydrophilic colloid layer can be gelatin. Other types of liquid crystalline dyes, such as H-aggregating dyes, can also be used, while yet other types of liquid crystalline dyes may not be appropriate.

Example light absorbing dyes for use for stereo viewing glasses 300 include the dye types of Formula I through Formula XXII, which are described in detail in U.S. Pat. No. 6,331,385 by (J. Deaton et al.), which is herein incorporated by reference in its entirety. The dyes of Formula I through Formula XX are cyanine, merocyanine, and oxonol dyes of the polymethine type. The dyes of Formula XXI, which is an azomethine dye, and Formula XXII, which is an azo dye, are also described by Deaton et al., but are not polymethine type dyes. Squarylium dyes, which are neither depicted nor discussed by Deaton et al., are also polymethine dyes, but ones which can require non-aqueous solvents for J-aggregation. Formula type XXIII provides for phthalocyanine dyes, which are non-polymethine dyes.

1. Cyanine dyes of the type Formula I:

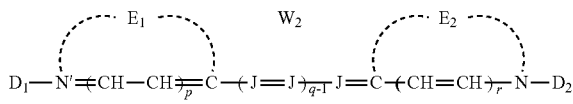

wherein $E_1$ and $E_2$ may be the same or different and represent the atoms necessary to form a substituted or unsubstituted heterocyclic ring which is a basic nucleus (see The Theory of the Photographic Process, 4th edition, T. H. James, editor, Macmillan Publishing Company, New York, 1977 for a definition of basic and acidic nucleus), each J independently represents a substituted or unsubstituted methine group, q is a positive integer of from 1 to 4, p and r each independently represents 0 or 1, $D_1$ and $D_2$ each independently represents substituted or unsubstituted alkyl or substituted or unsubstituted aryl and at least one of the $D_1$ and $D_2$ contains an anionic, cationic, or neutral substituent; and $W_2$ is one or more counterions as necessary to balance the charge. This dye is further described in Deaton '385 as a cyanine dye of Formula Ia.

2. Merocyanine dyes of the type Formula II:

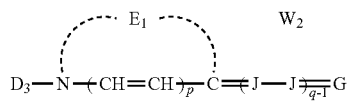

wherein $E_1$, $D_3$, J, p, q, and $W_2$ are as defined above for Formula I and G represents

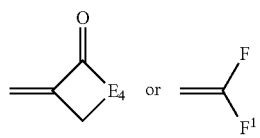

wherein $E_4$ represents the atoms necessary to complete a substituted or unsubstituted heterocyclic acidic nucleus, and F and $F^1$ each independently represents a cyano radical, an ester radical, an acyl radical, a carbamoyl radical, or an alkylsulfonyl radical, and $E_4$ represents the atoms necessary to complete a substituted or unsubstituted heterocyclic acidic nucleus. This dye is further described in Deaton '385 as a merocyanine dye of Formula IIb.

3. Oxonol dyes of the type Formula III:

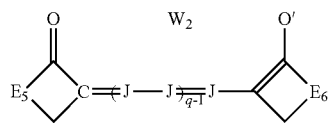

wherein J and $W_2$ are as defined above for Formula I and q is 2, 3 or 4, and $E_5$ and $E_6$ independently represent the atoms necessary to complete a substituted or unsubstituted acidic heterocyclic nucleus. This dye is further described in Deaton '385 as an oxonol dye of Formula IIc.

Other dyes which may or may not form liquid crystalline mesophases, J-aggregates, or H-aggregates, but which may be useful for stereo viewing glasses 300 include, but are not limited to, the following.

4. Oxonol dyes of the type Formula IV:

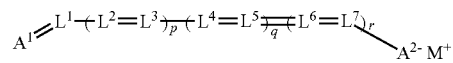

wherein $A^1$ and $A^2$ are ketomethylene or activated methylene moieties, $L^1$ to $L^7$ are substituted or unsubstituted methine groups, (including the possibility of any of them being members of a five or six-membered ring where at least one and preferably more than one of p, q, or r is 1); $M^+$ is a cation, and p, q, r are independently 0 or 1;

5. Oxonol dyes of the type Formula Va and Vb:

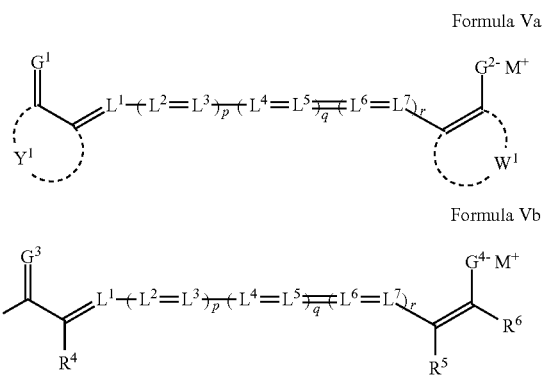

wherein $W^1$ and $Y^1$ are the atoms required to form a cyclic activated methylene/ketomethylene moiety; $R^3$ and $R^5$ are aromatic or heteroaromatic groups; $R^4$ and $R^6$ are electron-withdrawing groups; $G^1$ to $G^{4-}$ is O or dicyanovinyl (—C(CN)2)) and p, q, and r are defined as above in Formula IV, and $L^1$ to $L^7$ are defined as above in Formula IV.

6. Oxonol dyes of the type Formula VI:

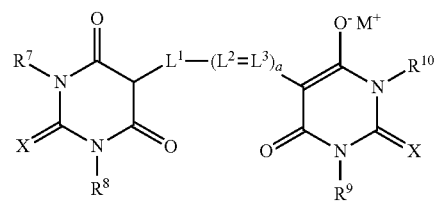

wherein X is oxygen or sulfur, $R^7$-$R^{10}$ each independently represent an unsubstituted or substituted alkyl group, an unsubstituted or substituted aryl group or an unsubstituted or substituted heteroaryl group, $L^1$, $L^2$ and $L^3$ each independently represent substituted or unsubstituted methine groups, $M^+$ represents a proton or an inorganic or organic cation, and n is 0, 1, 2, or 3;

7. Merocyanine dyes of the type Formula VII:

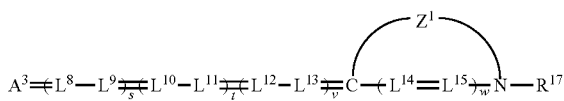

wherein $A^3$ is a ketomethylene or activated methylene moiety as described above; each $L^8$ to $L^{15}$ are substituted or unsubstituted methine groups (including the possibility of any of them being members of a five or six-membered ring where at least one and preferably more than 1 of s, t, v or w is 1); $Z^1$ represents the non-metallic atoms necessary to complete a substituted or unsubstituted ring system containing at least one 5 or 6-membered heterocyclic nucleus; $R^{17}$ represents a substituted or unsubstituted alkyl, aryl, or aralkyl group.

8. Merocyanine dyes of the type Formula VIII:

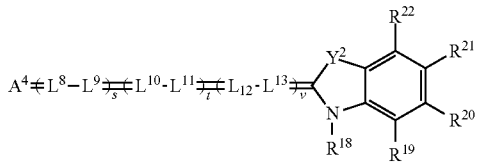

wherein $A^4$ is an activated methylene moiety or a ketomethylene moiety as described above, $R^{18}$ is substituted or unsubstituted aryl, alkyl or aralkyl, $R^{19}$ to $R^{22}$ each independently represent hydrogen, alkyl, cycloalkyl, alkenyl, substituted or unsubstituted aryl, heteroaryl, or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, including the atoms required to form fused aromatic or heteroaromatic rings, or groups containing solubilizing substituents as described above for Y. $L^8$ through $L^{13}$ are methine groups as described above for $L^1$ through $L^7$, $Y^2$ is O, S, Te, Se, NRx, or CRyRz (where Rx, Ry and Rz are alkyl groups with 1 to 5 carbons), and s and t and v are independently 0 or 1.

9. Merocyanine dyes of the type Formula IX:

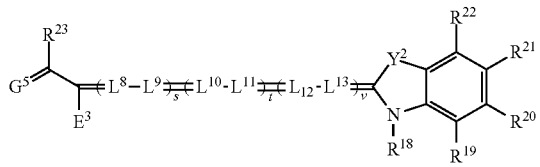

wherein $R^{23}$ is a substituted or unsubstituted aryl, heteroaryl, or a substituted or unsubstituted amino group; $G^5$ is O or dicyanovinyl (=C(CN)2), $E^1$ is an electron-withdrawing group, $R^{18}$ to $R^{22}$, $L^8$ to $L^{13}$, $Y^2$ and s, t, and v are as described above.

10. Merocyanine dyes of the type Formula X:

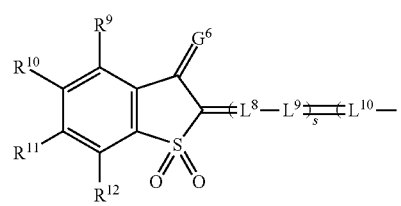

wherein $G^6$ is oxygen (O) or dicyanovinyl (=C(CN)2), $R^9$ to $R^{12}$ groups each individually represent groups as described above, and $R^{18}$, $R^{19}$ through $R^{22}$, $Y^2$, $L^8$ through $L^{13}$, and s, t and v are as described above.

11. Merocyanine dyes of the type Formula XI:

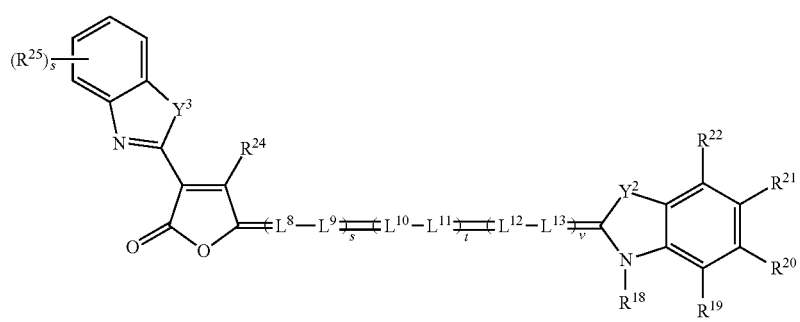

wherein $R^{25}$ groups each individually represent the groups described for $R^{19}$ through $R^{22}$ above, $Y^3$ represents O, S, NRx, or CRyRz (where Rx, Ry and Rz are alkyl groups with 1 to 5 carbons), x is 0, 1, 2, 3, or 4, $R^{24}$ represents aryl, alkyl or acyl, and $Y^2$, $R^{18}$, $R^{19}$ through $R^{22}$, $L^8$ through $L^{13}$, and s, t, and v are as described above.

12. Merocyanine dyes of the type Formula XII:

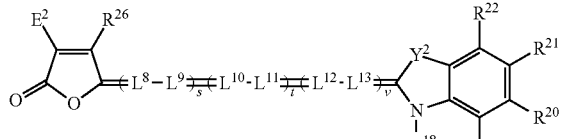

wherein $E^2$ represents an electron-withdrawing group, preferably cyano, R26 represents aryl, alkyl or acyl, and $Y^2$, $R^{18}$, $R^{19}$ through $R^{22}$, $L^8$ through $L^{13}$, and s, t, and v are as described above.

13. Merocyanine dyes of the type Formula XIII:

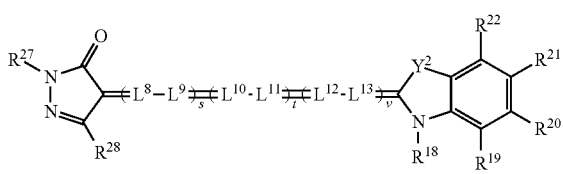

wherein $R^{27}$ is a hydrogen, substituted or unsubstituted alkyl, aryl or aralkyl, $R^{28}$ is substituted or unsubstituted alkyl, aryl or aralkyl, alkoxy, amino, acyl, alkoxycarbonyl, carboxy, carboxylate, cyano, or nitro; $R^{18}$ to $R^{22}$, $L^8$ to $L^{13}$, $Y^2$, and s, t, and v are as described above.

14. Merocyanine dyes of the type Formula XIV:

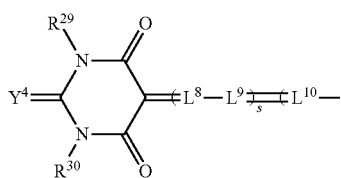

wherein $R^{29}$ and $R^{30}$ are each independently a hydrogen, substituted alkyl, aryl, or aralkyl, $Y^4$ is O or S, $R^{18}$ to $R^{22}$, $L^8$ to $L^{13}$, $Y^2$, and s, t and v are as described above;

15. General arylidene type dyes of the type Formula XV:

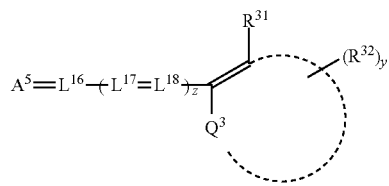

wherein $A^5$ is ketomethylene or activated methylene, $L^{16}$ through $L^{18}$ are substituted or unsubstituted methine, $R^{31}$ is alkyl, aryl, or aralkyl, $Q^3$ represents the non-metallic atoms necessary to complete a substituted or unsubstituted ring system containing at least one 5- or 6-membered heterocyclic nucleus, $R^{32}$ represents groups as described above for $R^{19}$ to $R^{22}$, y is 0, 1, 2, 3, or 4, Z is 0, 1, or 2.

16. Arylidene dyes, having an indole heterocycle of the type Formula XVI:

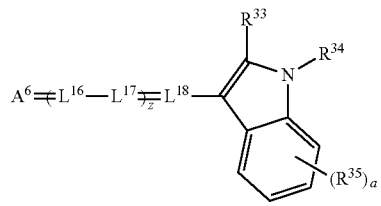

wherein $A^6$ is a ketomethylene or activated methylene, $L^{16}$ through $L^{18}$ are methine groups as described above for $L^1$ through $L^7$, $R^{33}$ is substituted or unsubstituted alkyl, aryl or aralkyl, $R^{34}$ is substituted or unsubstituted aryl, alkyl or aralkyl, $R^{35}$ groups each independently represent groups as described for $R^{19}$ through $R^{22}$, z is O, 2, or 2, and (a) is 0, 1, 2, 3 or 4.

17. Arylidene dyes of the type Formula XVII:

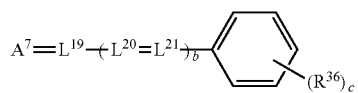

wherein $A^7$ represents a ketomethylene or activated methylene moiety, $L^{19}$ through $L^{21}$ represent methine groups as described above for $L^1$ through $L^7$, R36 groups each individually represent the groups as described above for $R^{19}$ through $R^{22}$, b represents 0 or 1, and c represents 0, 1, 2, 3, or 4.

18. Arylidene dyes of the type Formula XVIII:

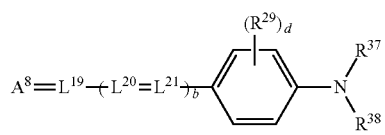

wherein $A^8$ is a ketomethylene or activated methylene, $L^{19}$ through $L^{21}$ and b are as described above, $R^{39}$ groups each individually represent the groups as described above for $R^{19}$ through $R^{22}$, and $R^{37}$ and $R^{38}$ each individually represent the groups as described for $R^{18}$ above, and d represents 0, 1, 2, 3 or 4.

19. Arylidene dyes of the type Formula XIX:

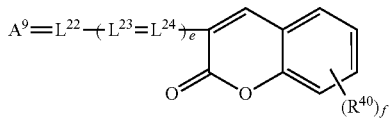

wherein $A^9$ is a ketomethylene or activated methylene moiety, $L^{22}$ through $L^{24}$ are methine groups as described above for $L^1$ through $L^7$, e is 0 or 1, $R^{40}$ groups each individually represent the groups described above for $R^{19}$ through $R^{22}$, and f is 0, 1, 2, 3, or 4.

20. Hemioxonol type dyes, used in synthesis of oxonol type dyes, of the type Formula XX:

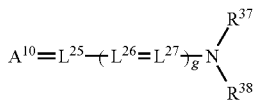

wherein $A^{19}$ is a ketomethylene or activated methylene moiety, $L^{25}$ through $L^{27}$ are methine groups as described above for $L^1$ through $L^7$, g is 0, 1, or 2, and $R^{37}$ and $R^{38}$ each individually represent the groups described above for $R^{18}$.

21. Non-polymethine dyes of the type Formula XXI (azomethine dye):

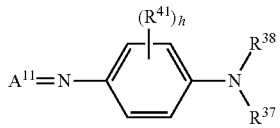

wherein $A^{11}$ is a ketomethylene or activated methylene moiety, $R^{41}$ groups each individually represent the groups described above for $R^{19}$ through $R^{22}$, $R^{37}$ and $R^{38}$ each represent the groups described for $R^{18}$, and h is 0, 1, 2, 3, or 4.

Cyanine dyes are organic molecules generally containing a polymethine bridge (a conjugated chain commonly having an odd number of methine carbons) between two nitrogen atoms, wherein both nitrogen atoms are independently part of a heterocyclic ring or a heteroaromatic moiety (such as pyrrole, imidazole, thiazole, pyridine, quinoline, indole, benzothiazole, etc). Merocyanine dyes generally differ from the cyanine dyes in containing an acidic heterocyclic nucleus or heterocyclic ring (such as rhodanine or pyrazolone) linked to a basic heterocyclic nucleus (such as quinoline or benzothiazole), and in not being ionized. Arylidene dyes have an arylidene moiety (a functional group having an aryl derivative of a methylene group) attached to a polymethine chain.

Squarylium or squaraine dyes, whose chemical structure is not depicted, but which are discussed in the reference of Yagi et al., are polymethine dyes that consist of an oxocyclobutenolate core with aromatic or heterocyclic components at both ends of the molecule. Squarylium dyes possess polymethine structures and are occasionally classified as cyanine dyes, as they exhibit intense light absorption and sometimes fluorescence emission, similar to cyanine dyes. However, the oxocyclobutenolate core provides a different charge transfer structure and resonance structure, which changes the optical response. The chemical structure of styryl dyes is likewise not depicted. Styryl dyes contain a chromophore comprising a polymethine chain, one end of which is attached to the nitrogen atom of a heterocyclic nucleus, and the other end of which is attached to the nitrogen atom of a dialkylamino group. The polymethine chain in styryl dyes consists of the carbon atoms of an aromatic nucleus, to which is attached the dialkylamino group. Some styryl compounds can resemble classical cyanine dyes in that they have two nitrogen atoms connected by a chain of conjugated double bonds, but differ from cyanines in that one nitrogen atom is not part of a heterocyclic nucleus.

22. Non-polymethine dyes of the type Formula XXII (azo dye):

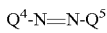

wherein $Q^4$ and $Q^5$ each represents the atoms necessary to form at least one heterocyclic or carbocyclic, fused or unfused 5- or 6-membered ring conjugated with the azo linkage.

Examples of positively charged substituents are 3-(trimethylammonio)propyl), 3-(4-ammoniobutyl), 3-(4-guanidinobutyl) etc. Other examples are any substituents that take on a positive charge in a coating binder, for example, by protonation such as aminoalkyl substituents, e.g.: 3-(3-aminopropyl), 3-(3-dimethylaminopropyl), 4-(4-methylaminopropyl), etc. Examples of negatively charged substituents are 3-sulfopropyl, 2-carboxyethyl, 4-sulfobutyl, etc.

Also, as previously stated, the lens filters 335 can include light absorbing dyes from outside the polymethine class of dyes. Phthalocyanine dyes are a notable example thereof. Non-limiting examples of phthalocyanine dye types of use for stereo glasses 300 are described in detail in "The Chemistry of Synthetic Dyes", Volume II, Chapter XXXVII, pp. 1118-1142, (1952) by K. Venkataraman, Academic Press Inc. New York, N.Y., or U.S. Pat. No. 4,311,775 (1982), or U.S. Pat. No. 4,382,033 (1983) by M. Regan, herein incorporated by reference, and summarized below.

23. Non-polymethine dyes of the type Formula XXIII (phthalocyanine dyes):

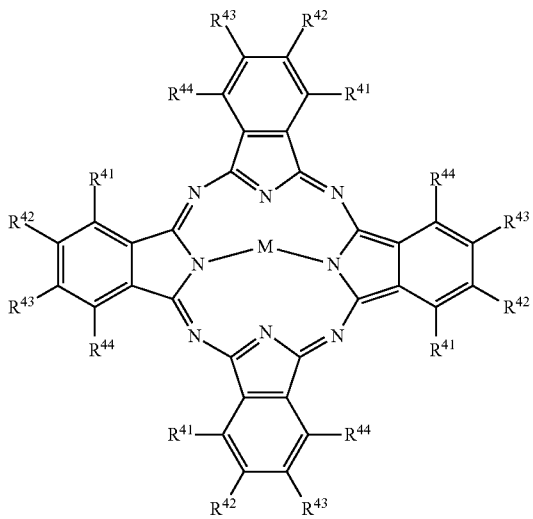

wherein M represents a metal ion selected from Li, Na, K, Cu, Ag, Be, Mg, Ca, Ba, Zn, Cd, Hg, Al, Sn, Pb, V, Sb, Cr, Mo, Mn, Fe, Co, Ni, Pd, or Pt; and $R^{41}$ to $R^{44}$ each independently represent hydrogen, alkyl, cycloalkyl, alkenyl, substituted or unsubstituted aryl, heteroaryl, or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, including the atoms required to form fused aromatic or heteroaromatic rings, or solubilizing groups such as sulfonic acid or carboxylic acid.

When reference is made to a particular moiety as a "group", this means that the moiety may itself be unsubstituted or substituted with one or more substituents (up to the maximum possible number). For example, "alkyl groups" refers to a substituted or unsubstituted alkyl, while "benzene groups" refers to a substituted or unsubstituted benzene (with up to six substituents). Generally, unless otherwise specifically stated, substituent groups usable on molecules herein include any groups, where substituted or unsubstituted, which do not destroy properties necessary for the stereo glasses utility. Examples of substituents on any of the mentioned groups can include substituents, such as: halogen, for example, chloro, fluoro, bromo, iodo; alkoxy, particularly those of "lower alkyl" (that is, with one to six carbon atoms, for example methoxy, ethoxy); substituted or unsubstituted alkyl, particularly lower alkyl (for example, methyl, trifluoromethyl); thioalkyl (for example, methylthio or ethylthio), particularly either of those with one to six carbon atoms; substituted and unsubstituted aryl, particularly those having from 6 to 20 carbon atoms (for example, phenyl); and substituted or unsubstituted heteroaryl, particularly those having a 5- or 6-membered ring containing one to three heteroatoms selected from N, O, or S (for example, pyridyl, thienyl, furyl, pyrrolyl); acid or acid salt groups such as sulfonate or carboxylate for example and others. Alkyl substituents may specifically include "lower alkyl" (that is, having one to six carbon atoms), for example, methyl, ethyl, and the like. Further, with regard to any alkyl group or alkylene group, it will be understood that these can be branched or unbranched and include ring structures.

In some preferred embodiments, dye types of Formulae I, II, III, IV, V, VII, IX, X, XV, and XVIII, which are polymethine dyes, and XXIII, which is a phthalocyanine dye, may be used. In some especially preferred embodiments, dyes of Formula I, Formula II, Formula III, and Formula XXIII may be used. In a subsequent discussion, a selection of specific preferred dyes are identified from the preferred types above, but which also include a dye of Formula XVI.

Dyes can be prepared according to various techniques, such as described The Theory of the Photographic Process, 4th edition, T. H. James, editor, MacMillan Publishing Company, New York 1977. Dyes also be purchased from commercial dye suppliers. Suppliers of commercial dyes and colorants are many. Some suppliers of polymethine dyes are Crysta-Lyn Chemical Company of Binghamton N.Y. USA, FEW Chemicals GmbH of Bitterfeld Wolfen Germany, H. W. Sands of Jupiter Fla. USA, Kodak Specialty Chemicals of Rochester N.Y. USA, and Sigma-Aldrich Chemical Company of St. Louis Mo. USA, for example. In particular, the Heterocycles catalog from Kodak Specialty Chemicals includes several preferred dye types, including indoles, pyrimidines, benzoxazoles, and benzothiazoles.

In some embodiments, the light absorbing dyes may include liquid crystal forming dyes or J-aggregating dyes. More specifically, at last one of the light absorbing dyes in at least one of the lens filters 335 may be a liquid crystal forming dye or a J-aggregating dye. As described above, the color or spectra of a dye is particularly dependent upon the environment of the dye. Some of the polymethine, and particularly cyanine dyes, can display unique spectral absorbance characteristics when they form dimers, polymers and aggregates in a particular environment. Aggregates are often manifested when the dissolved dye solution is evaporated to form a coating on a metallic surface, or is adsorbed onto a silver halide crystal surface, or dispersed in a thin layer of gelatin, or sometimes even simply dispersed in water.

Figure 5:
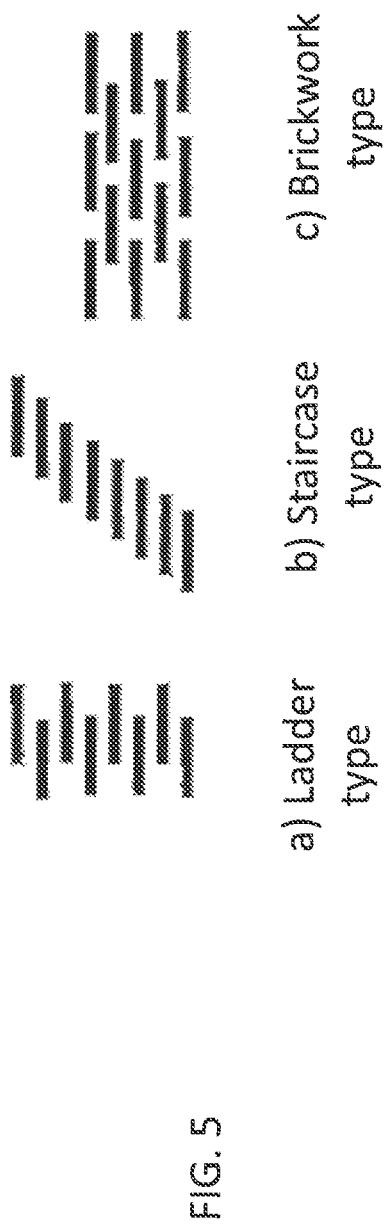
FIG. 5 schematically depicts the J-aggregation of dyes.

Two or more polymethine chromophores may be joined in a unique way altering the spectral properties of the resulting material. The chemical structure of the dyes, especially different ring, chain, or heteroatom substituents, can dramatically alter the aggregate state of the chromophoric material. As shown in FIG. 5, dyes which form aggregate structures may take on a physical brick like stacking arrangement of the individual molecules. Stacking angles of less than 55° are usually associated with J aggregation, while stacking angles of greater than 55° are associated with H aggregation. These altered absorbance spectra are referred to as dimer bands, H (hypsochromic) aggregate bands and J (Jelley-Scheibe) aggregate bands to clarify them from the more typically seen molecular absorbance bands. A more complete description of dyes and dye aggregation is reported in The Theory of the Photographic Process, 4th Ed., T. H. James, editor, Chapter 8 Sensitizing and Desensitizing Dyes by D. M. Sturmer and D. W. Heseltine; Chapter 9 Adsorption of Sensitizing Dyes to Silver Halide by A. H. Herz, Macmillan Publishing Company, New York, 1977.

The characteristic feature of an H-aggregate dye is an intense absorbance band hypsochromic of the molecular absorbance band of the dye. These H aggregate absorbance bands commonly display broad half band width and only rarely an intense narrow half band width. The characteristic feature of a J aggregate is commonly an intense absorbance band bathochromic of the molecular absorbance band of the dye. The J aggregate absorbance bands commonly display very narrow half band width. It has also been demonstrated that many J aggregating dyes exist in a liquid crystalline mesophase state. Both the H aggregate and the J aggregate structures will simultaneously display dimer (weak intensity) absorbance bands at intermediate wavelengths between the H aggregate, or J aggregate, absorbance and the molecular absorbance. Thus, a J aggregating dye may display an intense long wavelength peak absorbance with a very narrow half band width of sometimes less than 20 nm.

Examples of polymethine dyes displaying aggregating liquid crystalline properties are reported in "Liquid-Crystalline J-Aggregates Formed by Aqueous Ionic Cyanine Dyes", W. Harrison, D. Mateer, G. Tiddy, J. Phys. Chem., Vol. 100, pp. 2310-2321, 1996; "Liquid-Crystalline J-Aggregates Formed by Aqueous Ionic Cyanine Dyes", W. Harrison, IS&T/SPIE's symposium on electronic imaging: science & technology, pp. 111-116, 1997; and "Antenna Dye Sensitization: Principles and Fluorescence Studies", R. Parton, T. Penner, W. Harrison, J. Deaton, and A. Muenter, AgX 2004: International Symposium on Silver Halide Technology, Proceedings of IS&T and SPSTJ, pp. 161-164, 2004.

A J-aggregate is a type of dye with an absorption band that shifts to a longer wavelength (bathochromic shift) of increasing sharpness (higher absorption coefficient) when it aggregates under the influence of a solvent or additive or concentration as a result of supramolecular self-organization. All J aggregating dyes are liquid crystalline dyes, but not all liquid crystalline dyes are J aggregating dyes. Some liquid crystalline dyes are H-aggregating for example, and other liquid crystalline dyes are neither J-aggregating nor H-aggregating dyes. In either case, these liquid crystalline-like dyes are prone to liquid crystalline type self-assembly when placed in the certain environments. H-aggregating dyes can be used separately or in combination with J aggregating dyes.

Aggregating dyes with liquid crystalline mesophase properties are also reported in the following patents, here incorporated by reference:

U.S. Pat. No. 6,093,510, Liquid crystalline filter dyes for imaging elements, M. Helber, W. Harrison, K. Williams, and S. Kortum, 2000.

U.S. Pat. No. 6,180,295, Liquid crystalline filter dyes for imaging elements, M. Helber, W. Harrison, and R. Parton, 2001.

U.S. Pat. No. 6,214,499, Liquid crystalline filter dyes for imaging elements, M. Helber, W. Harrison, and R. Scaringe, 2001.

U.S. Pat. No. 6,331,385, Photographic material having enhanced light absorption, J. Deaton, R. Parton, T. Penner, W. Harrison, D. Fenton, 2001

U.S. Pat. No. 6,355,386, Liquid crystalline filter dyes for imaging elements, M. Helber, W. Harrison, and R. Parton, 2001.

U.S. Pat. No. 6,361,932, Photographic material having enhanced light absorption, R. Parton, T. Penner, W. Harrison, M. Helber, 2002.

U.S. Pat. No. 6,908,730, Silver halide material comprising low stain antenna dyes, R. Parton, T. Penner, D. Foster, S. Hershey, 2005.

The correlation between J-aggregates and liquid crystalline mesophases has been described in some detail as reported in "Liquid-Crystalline J-Aggregates Formed by Aqueous Ionic Cyanine Dyes", W. Harrison, D. Mateer, G. Tiddy, J. Phys. Chem., Vol. 100, pp. 2310-2321, 1996. It is concluded therein: "The solution J-aggregate state of cyanine dyes has been shown to be liquid crystalline in nature. The J-aggregate mesophase properties including structure, order dimensions and stability is however governed by the molecular structure of the dye and the short range intermolecular interactions of electrostatic, steric, and van der Waals forces. Dilute liquid crystals possessing long-range translation smectic or hexagonal periodicity and long-range orientational nematic order may all exhibit characteristic spectroscopic J-bands. Individual J-aggregates must be composed of many thousands or more of dye monomers, depending on the mesophase structure and concentration. The driving force for dye self-association is believed to result primarily form short range intermolecular attractive forces involving both sigma and pi electrons and not the hydrophobic effect. Thus, in a similar fashion to thermotropic mesogens, seeming minor changes to the generic cyanine dye structure can have a profound effect on the number, type, and stability of the mesophases observed."

Certain examples of specific dyes usable in stereo viewing glasses 300 are described below, with solution absorbance maximum and half band width (also known as full width at half maximum). Although solution spectra are discussed for one solvent (e.g., MEOH), a given dye can be put in solution in multiple solvents, yielding the same or different solution spectra than provided. In general, the coated dye spectra and the solution dye spectra may be substantially identical, although spectral shapes and peaks can shift and change as the solvents evaporate. J-aggregating and H-aggregating dyes are exceptions, as the coating spectra may be substantially different than the solution spectra, as modified by molecular alignment (FIG. 5).

The physical absorbance spectrum of nearly all dyes, as detailed in the spectra reproduced herein, have a steeper slope for the bathochromic absorbance, dropping away from the absorbance maximum, as compared to the slope of the hypsochromic absorbance, dropping away from the absorbance maximum on the short wavelength side. At higher energies, i.e. shorter wavelengths, all dyes will display secondary absorbance bands. Further, dyes which display absorbance bands with half band width (a.k.a.: full width at half maximum) of less than 20 nm are few.

In a low blue spectral range, generally providing a rejection band 390 between 430 and 440 nm, an absorber dye for a blue filter 365 has been identified, whose methanol (MEOH) solution spectra, which has a modestly narrow dye half bandwidth of ~35 nm, is the short blue absorber 415 whose transmission is shown in FIG. 6A. This first short blue absorber dye 415 (B1) can absorb the B1 primary and transmit the B2 primary, although a wider spectral gap 135 between primaries may be helpful. This dye is a hydrophobic cyanine dye of the Formula I type (or Formula Ia of Deaton '385), and more particularly is a chlorobenzothiazole simple cyanine dye, similar to HE48, as described in the Heterocycles catalog from Kodak Specialty Chemicals, Rochester N.Y., 2013. As an alternative, quinolone yellow (also known as solvent yellow 33), from the Sigma Aldrich Handbook of Stains, Dyes and Indicators (1991) has strong low blue absorption, with little visible light absorption above 460 nm. As another example, the blue absorbing DLS-441A dye, which is commercially available from Crysta-Lyn Chemical of Binghamton, N.Y., can be used.

The low blue B1 dye can be selected to have a strong low blue absorbance, and comparatively reduced absorbance in the high blue and other visible wavelengths of interest. For example, the dye can absorb greater than 95% of the light in a rejection band 390 between 430 and 440 nm, and then provides an extended pass band 392 with light absorption of less than 2% between 460-670 nm. The typical dyes can have lingering absorption in the 455 to 475 nm range, which then can constrain the dye density for the low blue absorption. In this application, significant low blue dye absorption can extend into ultraviolet (UV) without consequence. In some embodiments, the dyes, and particularly the low blue dye, do not fluoresce in the visible in response to UV illumination. However, as typically UV light is not present in significant quantities in a cinema environment, such risks are small.

Figure 6C:
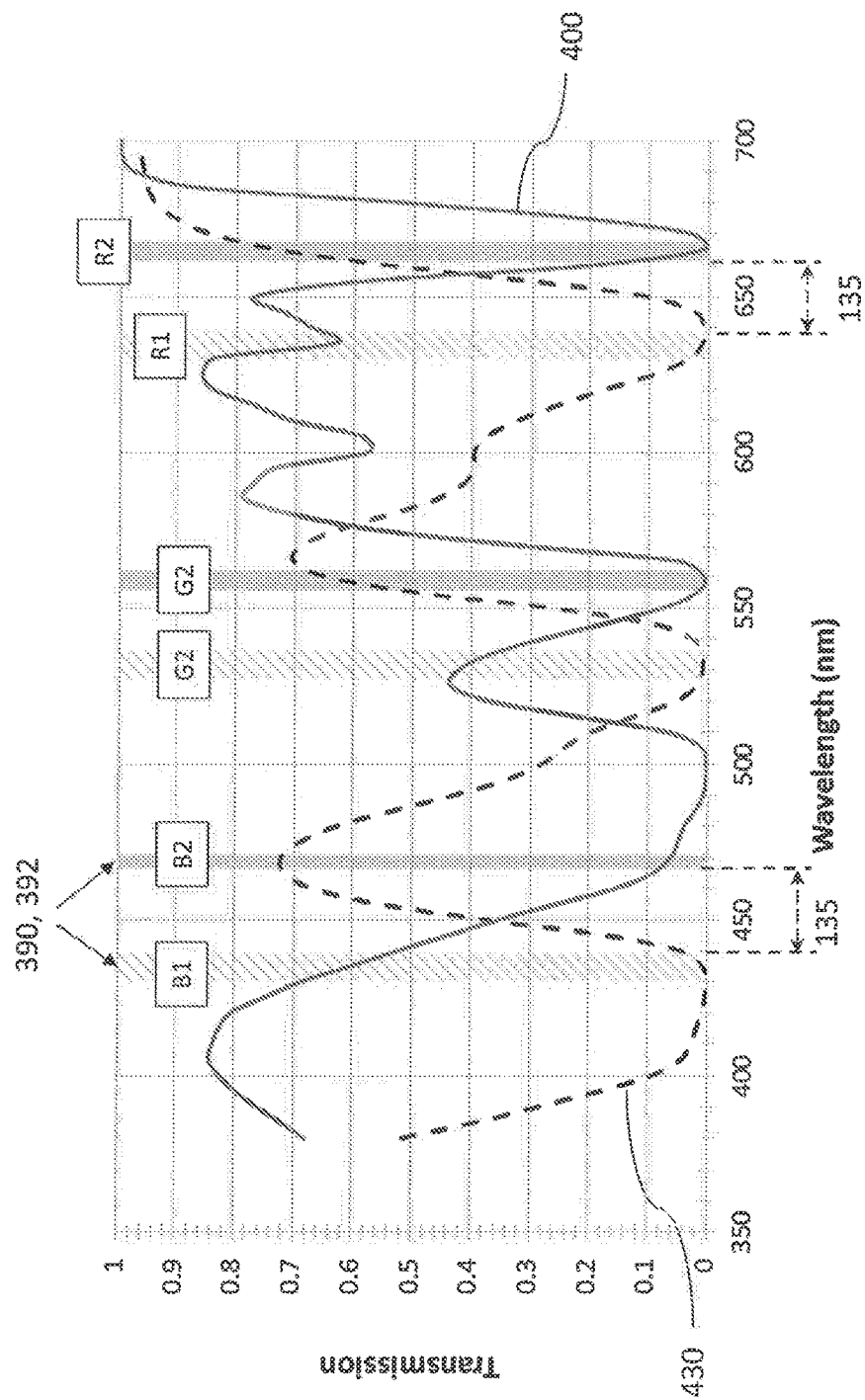
FIG. 6C depicts transmission spectra for the example lens filters described herein using the example absorber dyes depicted in FIGS. 6A and 6B.

In a long blue spectral range, for example generally providing a rejection band 390 between 465-470 nm, an absorber dye has been identified for a blue filter 365, whose MEOH/water solution spectra is the long blue absorber 445 (B2) shown in FIG. 6B. This amphiphilic dye is also cyanine dye of the Formula I type (or Formula Ia of Deaton '385), and more particularly is a chlorobenzothiazole carbocyanine dye, similar to HE90, as described in the Heterocycles catalog from Kodak Specialty Chemicals. As will be discussed in subsequent detail, this B2 dye has pronounced undesirable hypsochromic absorption that crosstalks into the low blue spectral band, attenuating excess B1 primary light in the pass band 392. This limits the dye absorption provided for the B2 primary in the rejection band 390. It has proven particularly difficult to find absorber dyes with narrow spectral absorbance peaks in the long blue, because the hypsochromic absorption is particularly pronounced. The best candidate dyes, including the depicted long blue absorber 445 have absorbance peaks in the 490-500 nm range, well offset from the optical bandwidth of the B2 primary. Considering FIG. 6C, which depicts the aggregate filter, a wider long blue B2 wavelength range for the projector light spanning ~462-472 nm may be more optimal.

In an example short green spectral range, for example generally providing a rejection band 390 between 529-535 nm, an absorber dye for a green filter 360 has been identified, whose acetonitrile solution spectra, which has a narrow dye half bandwidth of ~28 nm, is shown as short green absorber 410 or G1 in FIG. 6A. This first G1 dye is a thiobarbituric acid trimethine oxonol pyridinium salt of the Formula III type (or Formula IIc of Deaton '385), and is similar to an HE06 type dye in the Heterocycles catalog from Kodak Specialty Chemicals. As in the prior example, this dye has a hypsochromic spectral tail that causes significant undesired absorption in a shorter wavelength band (B2), although transmission exceeds 80%. The spectral gap 135 between the G1 and G2 primaries is narrow, and shifting the G1 primary 5 nm lower would help both the extinction provided by the G1 dye and the transmission provided by the R1 dye. As an alternative, which may be better suited for a shorter short green spectral range from 522-528 nm, dye S0537, which is a dichlorbenzimidazole carbocyanine dye of the Formula I type, from FEW GmBH, can be used.

In an example long green spectral range, for example generally providing a rejection band 390 between 555-560 nm, an absorber dye for a green filter 360 has been identified, whose J-aggregated coating spectra, which has a rather narrow dye half bandwidth of ~20 nm, is shown as long green absorber 440 or G2 in FIG. 6B. This first amphiphilic dye is a methylsulfonamidotricyanopropene benzoxazole merocarbocyanine sodium salt of the Formula II type (or Formula IIb of Deaton '385), which has a narrow spectra when J-aggregated in gelatin. It is described as dye "5-4" in U.S. Pat. No. 6,214,499 by Helber et al., which is incorporated herein by reference. The exemplary dye 5-4 transmission spectra (G2) shown in FIG. 6B is converted from measurement of the coated dye density for the J-aggregated coated dye in a gelatin. This transmission curve has a pronounced absorbance peak at ~558 nm and a prolonged tail of hypsochromic absorbance extending down to 450 nm. While this absorbance tail is undesirable, dye '5-4" actually provides lower levels of hypsochromic absorbance than all other candidate G2 dyes that were examined. Moreover, Helber '499 suggests that better spectral performance can be obtained with the J-aggregated dye 5-4 than is shown in FIG. 6B, indicating that further optimization of the J-aggregation coating process can yield beneficial results. In contrast, the solution spectra for dye 5-4 (not shown), which is not benefiting from J-aggregation, is peaked at ~495 nm, has a broad profile extending from 450-550 nm, and may in some examples not be suitable for this application.

Additionally, Helber '499 provides exemplary dyes with atypically narrow absorption spectra, including dyes "5-2, "5-4", and "15-1" from Table 24, each with nominal peak absorption near 553 nm when J-aggregated. Dyes 5-2 (tricyanopropene chlorobenzoxazole merocarbocyanine sodium salt of the Formula II type) and 15-1 (a carboxytricyanopropene indole arylidene sodium salt of the Formula XVI type) are may also be usable for stereo viewing glasses 300.

In an example short red spectral range, for example generally providing a rejection band 390 between 632-638 nm, an absorber dye for a red filter 355 has been identified, whose MEOH solution spectra which has a narrow dye half bandwidth of ~26 nm, is shown as short red absorber 405 or R1 in FIG. 6A. The peak absorption this dye provides is fairly well aligned with the R1 primary, although shifting either the R1 primary or the dye spectrum by a few nm. This first hydrophobic absorbing dye, which is a polymethine dye of the type that is an indole squarylium disodium salt, is commercially available as S458929 from Sigma Aldrich.

This exemplary R1 dye, as with most other exemplary dyes, has significant light absorption in lower wavelength spectral bands (G1 and G2). As a second exemplary R1 dye, FEW S 2087 from FEW GmbH, which is a hydroxy p-diethylaminophenyl squarylium inner salt, has a spectral peak at ~640 nm.

In an example long red spectral range, for example generally providing a rejection band 390 between 662-667 nm, an absorber dye for a red filter 355 has been identified, whose chloronapthalene solution spectra is long red absorber 435, or R2, shown in FIG. 6B. This first absorbing dye is a cyanine dye, SDA 9569, which is commercially available from HW Sands. This dye has a characteristic hypsochromically rippled spectrum seen with some aluminum or copper phthalocyanine dyes in solution in DMF (Dimethyl Formamide), including those of the formula XXIII type. Such dyes can have particularly narrow spectral half bandwidths of ~10-20 nm. Exemplary phthalocyanine dyes, such as 362530 and 446637 from Sigma Aldrich, are representative thereof, although for current purposes, their dye absorbance peaks may be shifted from their published values. As another alternative, which may be better for a shorter wavelength long red bandwidth, FEW 2275, which is a chlorobenzothiazole carbocyanine triethylammonium salt of the Formula I type, develops a narrow J-aggregation spectrum in gelatin with a peak at 650 nm.

Other wavelength bands may be used instead of the example bands identified above. For example, for an alternate short green (e.g., 520-525 nm), an example absorber dye is FEW S0046 from FEW GmbH, which is an amphiphilic soluble dichlorobenzimidazole carbocyanine dye of the Formula I type. Although the dye is soluble in both water and MEOH, a narrower spectral peak having a modestly narrow half bandwidth of ~33 nm is obtained at ~520 nm in the latter case. FEW GmbH can also commercially provide two other dyes, FEW S0041 (a dichlorobenzimidazole carbocyanine iodide salt) and FEW 0537 (Dichlorobenzimidazole carbocyanine sodium salt) which have similar spectra that can be apropos for a low green spectral filter. Although image projection with this alternate low green spectrum provides a significantly wider color gamut, and for the 6P filters, advantageously shifts the absorption band further from the long green wavelength band, it also shifts the extended hypsochromic absorbance further into the long blue wavelength band.

Likewise, an alternate short red wavelength band (e.g., 610-620 nm) can be used, with an accompanying 6P filter absorption band to block it. As an example, FEW 2278 from FEW GmbH, is a chain ethyl chlorobenzothiazole carbocyanine triethylammonium salt with a spectral peak having a rather narrow half bandwidth of ~18 nm at 620 nm when J-aggregated in a gelatin. In this instance, although shifting to lower wavelengths advantageously shifts the absorption band further from the long red wavelength band, it also modestly reduces the size of the potential color gamut, and the short wavelength side absorption of the short red dye can encroach on at least the long green, and potentially also the short green, with unwanted residual absorption.

Alternative blue dyes for alternative blue wavelength bands can also be used. For example, FEW S0512 which has an absorption peak at 405 nm, and FEW S0513, which has an absorbance peak at ~415 nm, and both of which are merocarbocyanine dyes, can be used in the low blue.

Although the stereo glasses 300 described herein have been discussed relative to six primary projection, light filtering lenses 340 can be constructed with light absorbing dyes to support projection with N≠6 color primaries, including N>6 primaries. Also the light absorbing dye for any given color band (e.g., G2 or R1) can further include at least two visible absorber dyes used in combination.

The three example absorber dye transmission spectra (405, 410, and 415, or B1, G1, and R1) of FIG. 6A provide visible light absorbing filters—RGB filters (355, 360, and 365)—that together (see FIG. 6C) form lens filter 335, with an aggregate filter spectrum 400 for a first eye. Each absorber dye provides a rejection band 390 to yield three spectrally offset rejection bands per lens filter 335, with the spectral gaps between or around the rejection bands 390 providing spectral passbands 392 for display light (transiting light 380). Likewise, the three absorber dye spectra (435, 440, and 445) of FIG. 6B provide RGB filters (355, 360, and 365, or B2, G2, and R2) that together provide a lens filter 335 with an aggregate filter spectrum 430 for a second eye thereby also defining rejection bands 390 and pass bands 392. The lens filters 335 for the first eye aggregate filter spectrum 400 and second eye aggregate filter spectrum 430 have juxtaposed rejection bands 390 and pass bands 392. Thus, if the lens filter 335 for the first eye aggregate filter spectrum 400 corresponds to the left eye lens 310, then the left eye sees the long RGB wavelength bands, while the short RGB wavelength bands are blocked. Likewise, if the lens filter 335 for the second eye aggregate filter spectrum 430 corresponds to the right eye lens 330, then the right eye sees the short RGB wavelength bands, while the long RGB wavelength bands are blocked. Thus, when the spectral separation or stereo viewing stereo glasses 300 are used in combination with a stereo projection system 200, then observers 60 can view stereo content that is color encoded with the spectral wavelength triplets (R1G1B1 or R2G2B2 respectively).

Because the set of absorbing dyes that transmits the R1G1B1 triplet and rejects the R2G2B2 triplet are chosen to transmit and absorb light in generally opposite spectral locations to the set of absorbing dyes that transmits the R2G2B2 triplet and rejects the R1G1B1 triplet, the pair of lens filters 335 will generally use different visible light absorbing dyes and are unlikely to have light absorbing dyes in common. However, in considering FIG. 6C, it is seen that both aggregate filter spectra (400 and 430) are relatively light transmitting in the yellow-orange spectral region between ~580-610 nm. Leaving this spectra open (transmitting) can be useful for theater safety lights or other messaging, for example. However, if necessary, an appropriate absorbing dye could be added to one or both lens filters 335 to block this wavelength band. In addition, other filters, such as for ultraviolet (UV) or infrared (IR) light blocking, can be provided to one or both lens filters 335.

FIG. 6E shows the resulting spectral transmission and spectral extinction, averaged over the various spectral bands, for lens filters 335 that use the absorber dye sets of FIG. 6C, where dye densities were generally scaled to favor extinction at the cost of transmission. FIG. 6E shows that most (four of six) of the absorber dyes (B1, G1, R1, and R2) meet the target spectral contrast specification (greater than 50:1). One of the dyes (G2) is close to the contrast specification (40:1), which can be acceptable if a relaxed ghosting specification can be tolerated, or it can meet the target with a modest further increase in green dye density. The remaining dye, B2, provides an extinction equivalent to only 10:1 CR.

These results may in some examples be generally limited by the off-peak, and particularly hypsochromic absorbance characteristics of the dyes. As FIG. 6C shows, the short blue primary B1 can helped for both efficiency and CR, by increasing the spectral gap 135 by shifting the B1 primary a few nm lower. Likewise, a few nm increase in the spectral location of the long red primary R2, increasing the associated spectral gap 135, can also help efficiency and CR. However, such spectral shifts in laser primaries may or may not be available. The B2 primary is well aligned for peak transmission, but not well aligned for peak CR. A similar outcome was obtained for the G2 primary. In either of these cases, a shift in laser primaries cannot by itself resolve the conflict. The dye spectra of FIGS. 6A-C illustrate spectra that can be obtained with these dyes, but do not necessarily represent optimal spectra from the dyes. In particular, it should be understood that these same dyes, or other dyes, can be adjusted with changes to solvents and coating environments and procedures, to further optimize such filter spectra.

Alternatively, as discussed in "The contrast sensitivity of human colour vision to red-green and blue-yellow chromatic gratings", by K. Mullen, in The Journal of Physiology, pp. 381-400 (1985), human visual perception is much less sensitive to modulation contrast at spatial frequencies above 2 cycles/degree in the blue, than in the red or green, as measured by the chrominance contrast sensitivity functions (CSFs). Thus, even if fine blue details are displayed on screen by projectors 100, whether for stereo or 2D content, people are less likely to perceive those details. Therefore, a reduced spectral contrast (e.g., dye B2 providing only 10:1, or 20-30:1 spectral contrast) from the lens filters 335 of stereo glasses 300 in the blue can be acceptable.

As FIG. 6B shows, the peak absorption for the B2 dye is at ~500 nm, rather than at ~475 nm, and increasing dye density to increase absorption at 465-470 nm causes very significant crosstalk absorption for the low blue 430-440 nm spectral band. A similar problem occurs for the G2 dye shown in FIG. 6B. In this case, although peak absorption does occur quite close to the target 555-560 nm spectral band, the hypsochromic absorption in the bandwidth of the short G1 529-535 spectral band is more than desired, and allows only ~42% transmission. Thus, while the eye filters of FIG. 6E have three spectral bands (B2, R1, and R2) where transmission exceeds the target >60%, and another two bands that are close (B1 and G2), the net transmission to the second eye in the low green is only ~39%. As is noted subsequently, these transmission values may understate actual performance, and AR coatings can help. Nonetheless, although stereo content can be viewed through glasses with such filters, the six channels can be unbalanced for spectral efficiency through the glasses, and projector(s) 100 may have to provide significant extra G1 light to compensate.

Figure 7A:
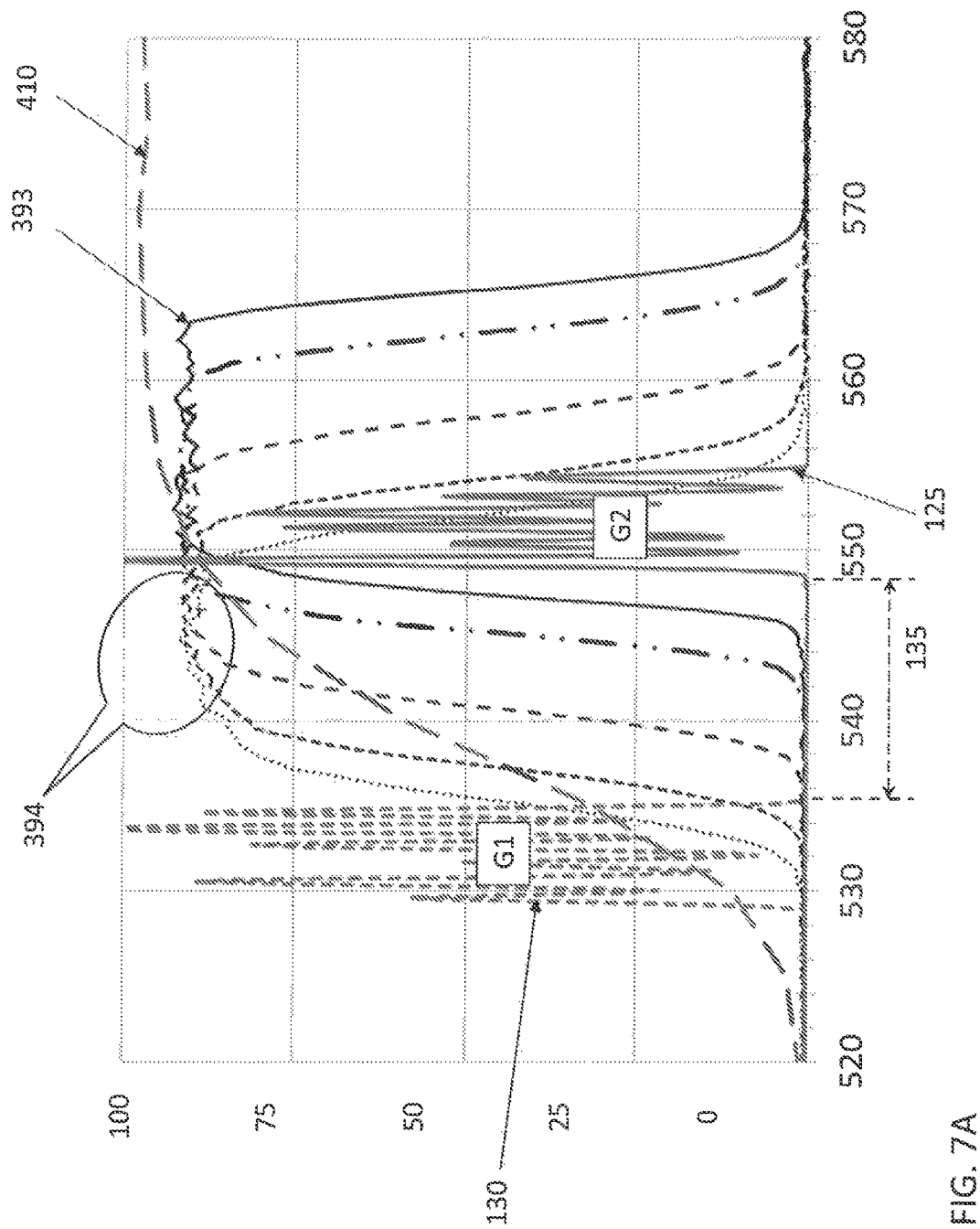
FIG. 7A is an illustration of a green portion of the visible spectrum, depicting representative spectra for dichroic 6P glasses, low green and high green light sources, and an absorber dye transmission spectra.

The dye transmission spectra of FIGS. 6A and 6B, and the resulting aggregate filter spectra of FIG. 6C, show that the spectral performance of these light absorbing dyes can have spectrally narrow absorbance peaks (e.g., from the selected dyes above, having 10-35 nm dye density half bandwidths), but yet do not provide the abrupt spectrally steep slopes of dichroic filters (e.g., see dichroic pass band 393 of FIG. 7A). Half bandwidths measured on an absorbance (density) scale can look broader when looked at in transmission space. Although the absorber dyes can have fairly abrupt transitions to high transmittance on the long wavelength side, the extended hypsochromic absorption significantly broadens and extends the absorption on the short wavelength side. Thus, while a J-aggregating dye can provide a spectral peak with a narrow ~20 nm half width, such dyes still exhibit hypsochromic absorption, and most spectrally "narrow" dyes seen in other applications have much wider peaks (e.g., 30-60 nm half bandwidths) than that as well. Alternative visible light absorbing dyes with much reduced hypsochromic absorption can be used in stereo viewing glasses 300 provided that such dyes can also provide a usefully located spectral peak for 6P viewing.

An alternative embodiment for stereo viewing glasses 300 includes a hybrid of absorber dyes with polarizers, which can in some examples provide better performance than the dyes of FIGS. 6A and 6B alone. In particular, each lens filter 335 can have an optional polarization filter (polarizer 375) as shown in FIG. 4B, which is preferably a linear polarizer, but which can also be a circular polarizer (linear polarizer and quarter wave plate). This polarization filter then transmits or rejects incident polarized light in accord with the polarization alignment thereof relative to the polarization filter. The polarizers 375 can be assembled to the lenses 340 with the polarization axis aligned to match the expected polarization states of the display light.

Figure 6D:
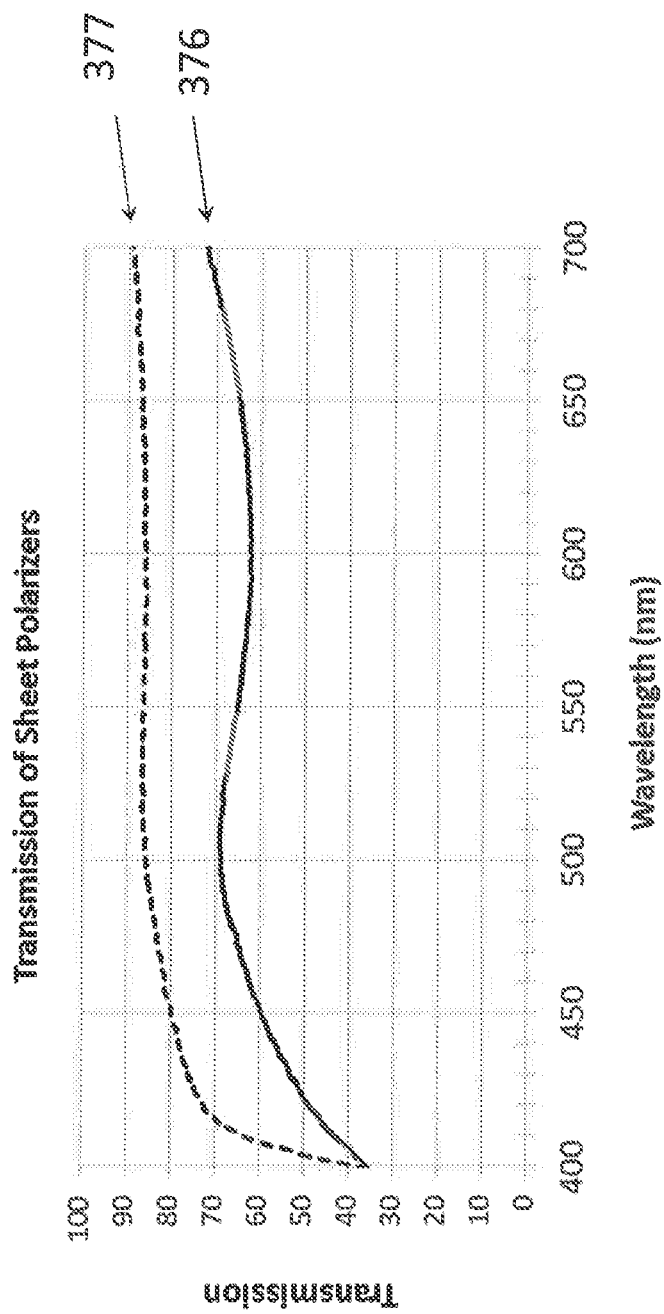
FIG. 6D depicts transmission spectra for example linear polarization filters.

As background, FIG. 6D depicts transmission spectra for polarized light through example linear polarizing films. The least transmissive example, polarizer spectral transmission 376, is for a high contrast polarizer like Polaroid HN32, which transmits only 65% green light and blocks with ~20:000:1 CR in the crossed state. For present circumstances, such high contrast polarizers are not required (although they may be used). Conventional polarizing glasses for cinema have similar behavior, better transmission (>80%) for polarized light in the green than HN32 polarizers, while extinguishing light in the crossed state at ~16,000:1 CR. As a further example, FIG. 6D depicts polarizer spectral transmission 377 for a moderate contrast linear polarizing film, which is Sanritz HLC2, which transmits ~85% of polarized light in the green, while extinguishing light in the crossed state at only ~1700:1 CR. Neglecting Fresnel reflection losses which can be removed by use of AR coatings, such polarizers may can transmit ~92-93% of incident polarized light. While this polarizer can be used, other polarizing sheets for this application would have yet higher transmission (~95%) and yet lower extinction (spectral contrast ~200-500:1 maximum, and as little as 20-100:1, depending on the screen and projector polarization purities).

If the lens filters 335 have both absorber dye red, green and blue filters (355, 360, and 365) and polarizers 375, and the light incident to the stereo glasses 300 from the screen 190 is both polarized and appropriately distributed as spectral triplets, then both light absorption filtering and polarization filtering can be used to block light to an eye. This assumes the left eye filter and right eye filter transmit nominally orthogonal polarization states to each other, whether linear or circular. As a result, the spectral contrast provided by the lens filters 335 can be reduced to a target of only ~10-20:1, and the absorber dyes can be printed or coated with less density, so as to favor spectral transmission over spectral extinction. The polarizers 375 will then boost the effective spectral contrast of the lens filters 340 from the 10-20:1 range to greater than or equal to 100:1, and preferably greater than or equal to 200:1 when the polarizers further filter the spectrally narrow and polarized incident light.

FIG. 6F shows the resulting spectral transmission and spectral extinction, averaged over the various spectral bands, for the same dyes as FIGS. 6A and 6B, but with the dye densities for this configuration of visible light absorbing filters reduced as compared to FIG. 6C, so as to favor transmission at the cost of extinction. All six dyes also provide spectral contrast in the target 10-20× contrast range. Additionally, nearly all six dyes have transmission that meets or exceeds the 60% target, and the G1 dye, at 59.3% is quite close. On the one hand, these transmission values will be reduced some when the polarizer transmission is accounted for, but on the other hand, Fresnel reflection losses have not been fully accounted for, and in the assembled lens filters 335 of FIGS. 4A and 4B, filter stacking will prevent Fresnel reflections at the internal surfaces, and use of optional AR coatings 370 can reduce losses at external surfaces. These factors mean the transmission performance values of Tables 1 and 2 approximate, but likely understate, the transmission performance of the stereo glasses 300. Nonetheless, with respect to the performance indicated by FIG. 6F, the transmission targets for the six dye filters is modified to be at least greater than or equal to 55%. It may also be possible to relax the spectral contrast further, to only 5-7:1 for the hybrid polarizer-absorber dye stereo glasses 300, as the polarization contrast can compensate.

As a further alternative, the green and red dyes can be coated to provide dye densities that nominally favor contrast over transmission, with the goal of providing at least 50:1 spectral contrast, while blue dyes can be coated to provide dye densities that nominally favor transmission over contrast, but without the use of a polarizer 375. For example, in FIG. 6G, the blue dyes provide only between 10:1 and 20:1 spectral contrast, while the green and red dyes provide at least 40:1 spectral contrast. In this embodiment, a target blue spectral contrast specification of less than or equal to 20:1 is proposed, although small deviations therefrom (e.g., less than or equal to 24:1) are included. A stereo image projection test with viewers 60 is expected to validate whether stereo glasses 300 providing equivalent, but poor, spectral contrast in the blue for both eyes (FIG. 6G) is superior or inferior to stereo glasses 300 providing significantly better spectral contrast in the blue for one eye versus the other eye (FIG. 6E). An intermediate case, where for example the B1 dye provides 40-60:1 spectral contrast, may also be an alternative.

Viewers 60 wearing hybrid stereo glasses 300 with lenses 340 having both absorber dye filters and polarizers 375 can experience less sensitivity to head alignment compared to regular linear polarization glasses. In the latter case, several degrees of head tilt degrades the stereo effect and allows content crosstalk between eyes. Additionally, there are costs to providing high polarization contrast from the projector, either in maintaining polarization through the projector itself by controlling stress birefringence and phase shifts, or in using an external converter (e.g., the RealD XL, RealD, Boulder Colo.). Typically, polarization maintenance at the screens is borderline (~200:1), which then burdens the glasses and projector polarization optics to compensate with high contrast to minimize further reductions. Therefore, relaxing the polarization requirements by having hybrid stereo glasses 300 that use both light absorbing dyes and polarization filtering can relax polarization requirements for other aspects of the system, thus increasing polarization design options.

Dyes can be either hydrophilic (water soluble), hydrophobic (non-polar solvent soluble) or amphiphilic (soluble in both water and non-polar solvents), which can effect fabrication of lens filters 335. Stereo glasses 300 may in some examples be manufactured by layering thin volume glass cuvettes containing dye solutions. In other examples, the dye solutions can be coated on the substrate 350 to form lens filters 335 as thin layers of absorbing dye. Individual thin dye layers can have a thickness of only 5-10 microns, for example. The substrate 350 can in some examples include optical glass such as Schott B270 (Schott AG, Mainz, Germany) or vision optimized glasses (Barberini GmbH, Gruenenplan, Germany). In other examples, the substrate 350 may include or consist of optically clear plastic. Plastic substrates can be made from acrylic, polycarbonate, CR-39, or polyurethane. In some examples, wherein polarizing optical technologies are used in conjunction with absorber dyes, the support or substrate 350 may be non-birefringent. Cellulose triacetate (a.k.a.: TAC) can be used for this purpose. In some particular examples, separate sheets of individually dye coated cellulose triacetate may be assembled into "right eye lens" and "left eye lens" by laminating three sheets with an appropriate optically clear pressure sensitive adhesive. In this example, the laminated sheets can be attached to the substrate 350 for greater support, or alternately the laminated sheets of the lens filter 335 essentially become the substrate.

As discussed above, dye absorbance spectral curves can be highly dependent upon the environment of the dye. Most of the dye spectra previously discussed have been spectral curves of dyes dissolved in a solvent, for example methanol. When a solvent soluble dye is dissolved, coated and dried to a thin layer on a plastic support, the spectral curve shape of the dye can change, and the coated dye density has different spectral characteristics than the solution of the same dye. The environmental influence and spectral changes are dramatic for J-aggregating dyes, such as the G2 dye "5-4" discussed previously, where the spectra depend on liquid crystal type molecular alignment (FIG. 5), but are typically much less impactful on the other dyes. Experimentation is required to optimize (position and shape) or minimize any spectral changes from the coating process or substrate interactions. Although dye coating spectra can be tuned, there are limits thereof, and the spectral bandwidths or center wavelengths of one or more primaries (light sources 120rgb) may also have to be tuned to match what the dyes can produce.

Dyes which are soluble in solvents (e.g.: acetone, dichloromethane) can require coating operations which enable removal of vaporous solvents, while uniformly distributing these non-liquid crystal forming dyes within a hydrophobic or non-aqueous binder layer. In some examples, spin coating of dissolved dye solutions on cellulose triacetate support will be adequate. In other examples, in-line roll-to-roll coating and drying operations can be used. Regardless of the coating operation used, or the type of dye used (e.g., J-aggregating, hydrophilic or hydrophobic), a uniform coating density may be provided over the surfaces of a lens filter 340. As an example, an appropriate coating density specification for density uniformity over the lens surface can be $\pm\frac{1}{20}^{th}$ of the peak coating density.

In some examples, dyes which are soluble in water can be dissolved in water with accompanying gelatin, and then coated onto an optically clear plastic support. This process would be similar to the production of Wratten filters, manufactured by the Eastman Kodak Company (Rochester, N.Y.) and sold under license through the Tiffen Corporation (Hauppauge, N.Y.). Additionally, when an appropriate type of water soluble dye is dissolved in water with accompanying gelatin and then coated, dye aggregation (see FIG. 5) can occur, and the absorbance spectral curve shape of the dye can be substantially different from when in a solution environment. Some of these aggregate structures display liquid crystalline like properties. U.S. Pat. No. 6,355,386 (Helber) et al reports: "There are few teachings addressing dye lyotropic liquid crystalline phases. Additionally, no teachings are provided that would enable one skilled in the art to design and synthesize dyes capable of forming liquid crystals or to influence their formation of imaging elements." A procedure to test for liquid crystalline aggregate formation is described in Helber '386 and is reproduced below.

Direct Gelatin Dispersion (DGD) Formulation Procedure:

Nominally 2.000 grams of water then 0.1250 grams of deionized gelatin were weighed into screw-topped glass scintillation vials and allowed to soak at 25° C. for at least 30 minutes. The swollen gelatin was then melted at 50° C. for 15 minutes with agitation. The gelatin solution was cooled to 25° C., then refrigerated at 5° C. to set. Nominally 2.870 grams of water was then added on top of the set gelatin followed by 0.0050 grams of powdered dye. The dye powder was thoroughly wetted and dispersed in the water layer by agitation and then allowed to stand at 25° C. for 17 hours. The samples were then heated to 60-80° C. in a water bath for 1-2 hours and mixed with intermittent agitation. The samples were subsequently cooled to 39.0° C. over a period of approximately 1 hour and maintained at this temperature until measurement. Small aliquots of the gelled dye dispersions were then removed from the glass vials and sandwiched between a pre-cleaned glass micro slide (Gold Seal Products, USA) and micro cover glass (VWR Scientific, USA) to form a thin film. Each slide was held at ambient temperature and humidity for at least 17 hours and the absorbance spectra for these gelatin films was then measured at 25° C."

This process nominally results in a liquid crystal forming dye or J-aggregating dye being imbedded in a hydrophilic colloid layer of gelatin. As was discussed with respect to long green absorber 440 or dye '5-4" of FIG. 6B, J-aggregation spectra can be quite variable. Optimization of a J-aggregation process to repeatedly produce a given target spectra for a coated dye density can depend on process conditions (e.g., temperature, solvent), type of gelatin used, and substrate surface properties. Although most J-aggregating dyes form with the dye initially in solution in water, some can require a solvent, such as DMSO. Depending on such parameters, a J-aggregation can occur but the absorbance profile can shift or change shape, or J-aggregation can substantially fail. In the former case, development of a controlled J-aggregation process can enable coating spectra to be modestly tuned for spectral peak position (e.g., ±10 nm) and shape and repeatedly reproduced in the manufacture of lens filter 340.

In the prior discussion, sets of exemplary light absorbing dyes for lens filters were identified and described: for a lens filter 335 for one eye, a short blue absorber 415 in MEOH, a short green absorber 410 in acetonitrile, and a short red absorber 405 in MEOH, and for a lens filter 335 for the other eye, a long blue absorber 445 in a water/methanol mixture, a long green absorber 400 J-aggregated with water, and long red absorber 435. As noted previously, these dyes may be hydrophilic (water soluble), hydrophobic (non-polar solvent soluble) or amphiphilic (soluble in both water and non-polar solvents), and coated with appropriate aqueous or non-aqueous binders. In constructing lens filters 335 therefrom, it can be advantageous to coat dyes of like solvent chemistry adjacently or together, and for example, to separate hydrophilic dyes from hydrophobic dyes. This material property difference can affect robustness or self-adhesion of the overall structure, particularly at interfaces between layers. For example, if water vapor infiltrates a lens filter 340, two such hydro-distinct layers could separate. As a result, the lens filters 335 may not be fabricated with a color sequential filter order as suggested in FIGS. 4A and 6, but with a solvent preferential filter order. For example, an amphiphilic dye layer or other mutually compatible layer may separate hydrophobic and hydrophilic dye layers, so that a space or gap (e.g. 0.1-0.5 mm) is between the hydrophobic dye and hydrophilic dye. Alternatively, a cross-link may be provided between the hydrophobic dye and the hydrophilic dye. For example, hydrophobic layers can be modified by a cross-linking process such as a photo-cross linking process, to allow hydrophilic layers to then be formed thereon. Lens filters 335 can also have intermediate layers (not shown) between hydrophobic and hydrophilic coatings to act as a barrier layer, sealing layer, or intermediary support that aids the coating process or alters chemical or surface interactions between the hydrophobic and hydrophilic coatings. The separating space could be an air gap. Absorber dye filters can also be coated separately as films, and then laminated, fused, or adhered together to form lens filters 335. The lens filters 335 can also be sealed at the lens edges or the seats of the frames 305 to prevent water vapor penetration. Water vapor penetration through the top or bottom surfaces can also be controlled, for example by using materials with reduced MVTRs (moisture vapor transmission rates).

Figure 7B:
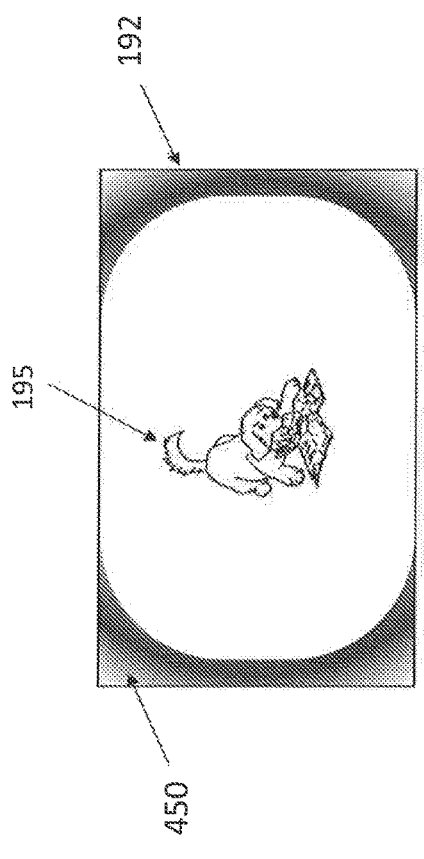
FIG. 7B is an illustration of a projected field of view that includes an image, where at the edges of the projected field of view, leakage light becomes visible to viewers who are wearing 6P dichroic stereo viewing glasses.

As previously noted, 6P dichroic glasses, due to response variations with angle or field of view, can have contrast leakage problems for large fields of view (e.g., >32.5°) due to both pass band transmission fall-offs and rejection band transmission increases, which in combination cause contrast loss. These contrast losses can be particularly troublesome for the long wavelength lens filter 335, as the spectral shift with angle can transmit light from the neighboring short wavelength color primary. This is shown in FIG. 7A, where the 6P dichroic pass band 393 shifts to shorter wavelengths, creating shifted dichroic pass bands 394 which have increasing shifts with increasing angle. FIG. 7A also illustrates a spectra of long green light 125, provided by a long wavelength green light source 120g, that is within the 6P dichroic pass band 393 when the light is incident on the lens optical axis. As the light incidence angle to the glasses increases with increasing FOV, the shifted 6P dichroic pass bands 394 increasingly transmit less of the long green light 125, and increasingly transmit greater amounts of the short green light 130. These effects in combination can cause pronounced contrast loss, which can become color fringing at the edges of the projected field of view. This is illustrated in FIG. 7B, where a projected field of view 192 includes an image 195 projected by image light 175, and where at the edges of the projected field, leakage light 387 through an angularly shifted pass band 392 (now shifted dichroic pass bands 394) becomes visible to viewers 60 who are wearing the 6P dichroic stereo viewing glasses. This leakage light can appear as color fringing 450, and can readily be more perceptible than the content of the overlapping projected image 195. Typically the color fringing 450 is most objectionable, in terms of projected area and brightness of the leakage light 387, in red and green, rather than blue. The color fringing 450 can also be uneven, with red encroaching further into the projected image 195 than does green, which creates a rainbow effect.

Figure 7C:
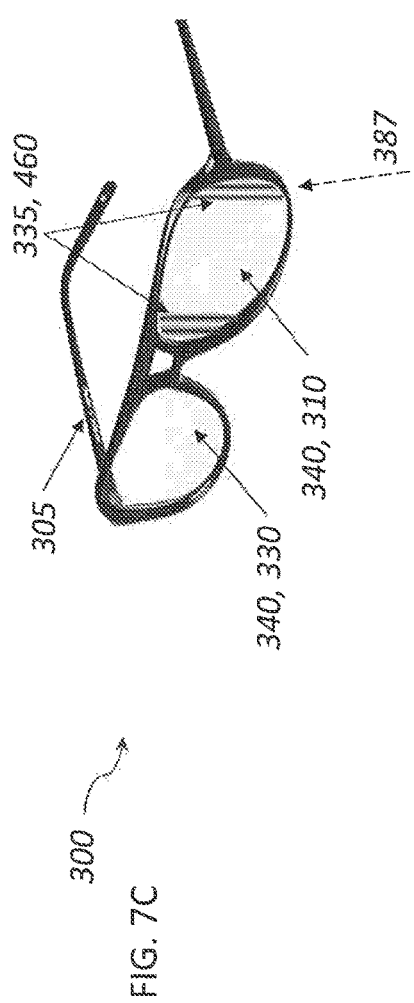
FIG. 7C is an illustration of an alternate embodiment of stereo viewing glasses.

As one potential solution to this problem, stereo viewing glasses 300 can have masking to block this leakage light from reaching a viewer's eyes. FIG. 7C depicts an alternative embodiment, wherein hybrid stereo viewing glasses 300 are shown, in which the primary portion of the lenses 340 provides 6P dichroic color filtering, of the type shown in FIG. 7A. These hybrid stereo viewing glasses 300 then have at least one lens 340 that also includes a light absorbing dye based lens filter 335 that spatially overlaps a portion of the dichroic filter, creating a hybrid portion where the lens filter 335 serves as a mask 460 to block the leakage light 387 that creates the color fringing 450. A mask 460 can be provided at one or more edges of a lens 340.

The primary dichroic filter portion and the mask portion(s) can be fabricated on separate substrates and mounted together. However, the lens filter 335 of mask 460 can be coated directly onto the dichroic filter, or the substrate thereof, or the lens filter 335 can be coated on a separate substrate and adhered or laminated to the dichroic filter structure. As shown in the green spectra example of FIG. 7A, the lens filter 335 for mask 460 can include a dye that is a short green absorber 410, which substantially attenuates the short green light 130 and substantially transmits the long green light 125. This absorbing dye can be a dye selected to block the short green spectra, such as the short green absorber 410 or G1 depicted in FIG. 6A. Alternately, one or more dyes whose absorbance peak is shifted to lower green wavelengths, such as the previously discussed S0537 or S0046 dyes from FEW GmbH, can be selected for this use. Although using such dyes with absorbance peaks at lower green wavelengths may also have extra residual absorption effecting the long blue light than will the alternative long green peaked dyes (such as the G1 dye), at the edges of a lens 340, it can in some embodiments be more important to attenuate the bright leakage light 387 than to preserve the greatest transmission of the long wavelength light in the next color channel down. This also applies to the selection of a red light absorbing dye for the lens filter 335 of mask 460. In part, this may be because the angularly shifted 6P dichroic pass bands 394 are typically not transmitting the image light (e.g., the long green light 125 of FIG. 7A) as efficiently.

The lens filter 335 for mask(s) 460 can be selectively or controllably coated to have the light absorbing dye(s) provide a gradient filter. For example, a linear gradient density pattern, with greater density towards the edges of a lens 340, can be used. Although FIG. 7C depicts the lens filters 335 for masks 460 as coated straight with a straight edge on the inner side(s), the mask filters can also be provided with rounded edges to generally match the rounded inner edges of the color fringing 450 depicted in FIG. 7B.

As discussed, the example absorber dye spectra (405, 410, and 415) of FIG. 6A and the absorber dye spectra (435, 440, and 445) of FIG. 6B provide RGB filters (355, 360, and 365) B1, G1, and R1 that are interleaved with RGB filters B2, G2, and R2, as corresponds with the interleaved wavelength of first set 445 nm, 532 nm, and 635 nm, and second set 465 nm, 550 nm, and 660 nm. The use of interleaved wavelengths can allow each eye to see red, green, and blue colors, as well as mixture colors such as white. Alternatively, two display wavelengths can be adjacent (e.g., 445 nm, 465 nm, and 550 nm go to one eye, while 532 nm, 635 nm, and 660 nm go to the other eye). Non-interleaved absorber dyes can then be provided to block the 445 and 465 nm light, and 635 and 660 nm light, respectively. Accordingly, the same dyes provided in FIG. 6E or FIGS. 6A,B can be reconfigured, or alternate broader spectrum absorption dyes can be sought. Such non-interleaved configurations can in some examples facilitate attaining the transmission and contrast targets.

Quantum dots (Qdots) are a developing technology that is gaining traction in the display industry, where for example, 3M (Saint Paul, Minn.) has introduced a quantum dot enhancement film (3M™ QDEF) to narrow the color primaries in LCD screens. For the present application, a quantum dot film, having Qdots (engineered nanoparticles) that absorb light but do not then re-emit spectrally shifted light, could substitute for one or more of the absorber dyes. However, at present Qdots tend to broader absorbance peaks than the light absorbing dyes discussed herein, as well as extended bathochromic and hypsochromic absorption about the absorption peak, although the bathochromic (long wavelength) absorbance can be more significant. Qdots may for example be used selectively, for example to potentially provide an alternate long red absorber having less hypsochromic absorption than absorber dyes (e.g., R2 absorber=HW Sands SDA 9569).

The above description makes reference to glasses having a lens filter in a left eye lens and a right eye lens. In alternative examples, the lens filters described above may be provided in another type of stereo viewing device, other than glasses. For example, the lens filters may be provided in another type of device worn on the head, such as a helmet. For further example, the lens filters may be provided in a device that is held to the eyes, rather than worn, such as a binocular type device. For further example, the lens filters may be provided in a device that is not worn or held. For example, the lens filters may be provided in a free-standing apparatus, such as a binocular type device mounted on a stand.

What is claimed is:

1. A stereo viewing device, comprising:
a first lens comprising a first lens filter, the first lens filter comprising a first set of light absorbing dyes that define a first set of rejection bands, and the first set of light absorbing dyes comprising at least a first polymethine dye; and
a second lens comprising a second lens filter, the second lens filter comprising a second set of light absorbing dyes that define a second set of rejection bands different from the first set of rejection bands, the second set of light absorbing dyes comprising at least a second polymethine dye, wherein at least one of the light absorbing dyes in at least one of the first or second set of lens filters is a liquid crystal forming dye.

2. The stereo viewing device of claim 1, wherein the first polymethine dye and the second polymethine dye are selected from the group consisting of cyanine dyes, merocyanine dyes, arylidene dyes, complex cyanine dyes, complex merocyanine dyes, homopolar cyanine dyes, hemicyanine dyes, styryl dyes, hemioxonol dyes, oxonol dyes, and squarylium dyes.

3. The stereo viewing device of claim 1, wherein at least one of the first lens filter and the second lens filter further comprises an additional light absorbing dye selected from the group consisting of anthraquinone dyes, triphenylmethane dyes, azo dyes, azomethine dyes, coumarin dyes, and phthalocyanine dyes.

4. The stereo viewing device of claim 1, wherein each of the first and second lens filters each transmit a portion of incident visible light in respective first and second pass bands that are defined by the respective first and second rejection bands to be in the spectral gaps between the respective first and second rejection bands.

5. The stereo viewing device of claim 1, wherein the first lens further comprises a first polarization filter that transmits light of a first polarization, and the second lens further comprises a second polarization filter that transmit light of a second polarization different from the first polarization.

6. The stereo viewing device of claim 1, wherein the at least one liquid crystal forming dye is a J-aggregating dye.

7. The stereo viewing device of claim 1, wherein the at least one liquid crystal forming dye is an H-aggregating dye.

8. The stereo viewing device of claim 1, wherein the liquid crystal forming dye is embedded in a hydrophilic colloid layer.

9. The stereo viewing device of claim 8, wherein the hydrophilic colloid layer comprises a gelatin.

10. The stereo viewing device of claim 8, further comprising at least one layer of a non-liquid crystal forming dye in a hydrophobic binder layer.

11. The stereo viewing device of claim 10, further comprising a first support for the hydrophilic colloid layer and a second support for the hydrophobic binder layer.

12. The stereo viewing device of claim 1, wherein the first set of light absorbing dyes comprises a combination of a hydrophobic polymethine dye and a hydrophilic polymethine dye.

13. The stereo viewing device of claim 12, wherein the first lens comprises at least one of (i) a space between the hydrophobic polymethine dye and the hydrophilic polymethine dye, (ii) an amphiphilic polymethine dye between the hydrophobic polymethine dye and the hydrophilic polymethine dye (iii) a cross-link between the hydrophobic polymethine dye and the hydrophilic polymethine dye, (iv) a barrier layer between the hydrophobic polymethine dye and the hydrophilic polymethine dye, and (v) a seal between the hydrophobic polymethine dye and the hydrophilic polymethine dye.

14. The stereo viewing device of claim 1, wherein the first lens further comprises at least one quantum dot material providing at least one additional rejection band.

15. The stereo viewing device of claim 1, wherein the first set of light absorbing dyes comprises a first red light absorbing polymethine dye, a first green light absorbing polymethine dye, and a first blue light absorbing polymethine dye, and the second set of light absorbing dyes comprises a second red light absorbing polymethine dye, a second green light absorbing polymethine dye, and a second blue light absorbing polymethine dye.

16. The stereo viewing device of claim 15, wherein each red light absorbing polymethine dye and each green light absorbing polymethine dye provide greater than or equal to 40:1 spectral contrast for a ratio of pass band light to rejection band light.

17. The stereo viewing device of claim 16, wherein each blue light absorbing polymethine dye provides less than or equal to 20:1 spectral contrast for a ratio of passband light to rejection band light.

18. The stereo viewing device of claim 1, wherein the first set of rejection bands and the second set of rejection bands each include light at wavelengths of between 400 to 500 nm, 500 to 600 nm, and 600 to 700 nm.

19. The stereo viewing device of claim 1, wherein each of the light absorbing dyes provides a spectrally narrow absorption peak in the visible spectrum of 10 to 40 nm.

20. The stereo viewing device of claim 1, wherein the first set of rejection bands is interleaved with the second set of rejection bands.

21. The stereo viewing device of claim 1, wherein the first set of rejection bands is non-interleaved with the second set of rejection bands.

22. The stereo viewing device of claim 1, wherein at least one of the first polymethine dye and the second polymethine dye is a cyanine dye of the following formula:

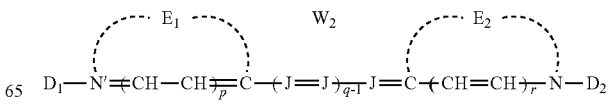

wherein:
$E_1$ and $E_2$ are the same or different and represent the atoms necessary to form a substituted or unsubstituted heterocyclic ring which is a basic nucleus,
J independently represents a substituted or unsubstituted methine group,
q is a positive integer of from 1 to 4,
p and r each independently represents 0 or 1,
$D_1$ and $D_2$ each independently represents substituted or unsubstituted alkyl or substituted or unsubstituted aryl and at least one of $D_1$ and $D_2$ contains an anionic, cationic, or neutral substituent,
and $W_2$ is one or more counterions as necessary to balance the charge.

23. The stereo viewing device of claim 1, wherein at least one of the first polymethine dye and the second polymethine dye is a merocyanine dye of the formula:

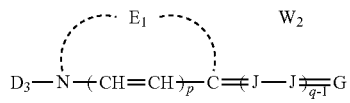

wherein:
$E_1$ represents the atoms necessary to form a substituted or unsubstituted heterocyclic ring which is a basic nucleus,
$D_3$ represents substituted or unsubstituted alkyl or substituted or unsubstituted aryl and contains an anion, cationic, or neutral substituent,
J independently represents a substituted or unsubstituted methine group,
q is a positive integer of from 1 to 4,
p independently represents 0 or 1,
$W_2$ is one or more counterions as necessary to balance the charge,
and G represents:

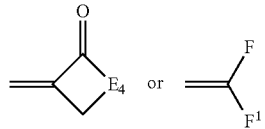

wherein:
$E_4$ represents the atoms necessary to complete a substituted or unsubstituted heterocyclic acidic nucleus,
F and $F^1$ each independently represents a cyano radical, an ester radical, an acyl radical, a carbamoyl radical, or an alkylsulfonyl radical,
And $E_4$ represents the atoms necessary to complete a substituted or unsubstituted heterocyclic acidic nucleus.

24. The stereo viewing device of claim 1, wherein at least one of the first polymethine dye and the second polymethine dye is an oxonol dye of the formula:

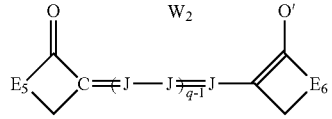

wherein:
J independently represents a substituted or unsubstituted methine group,
$W_2$ is one or more counterions as necessary to balance the charge,
q is 2, 3 or 4,
and $E_5$ and $E_6$ independently represent the atoms necessary to complete a substituted or unsubstituted acidic heterocyclic nucleus.

25. The stereo viewing device of claim 1, wherein at least one of the first set of light absorbing dyes and the second set of light absorbing dyes comprises a non-polymethine phthalocyanine type dye of the formula:

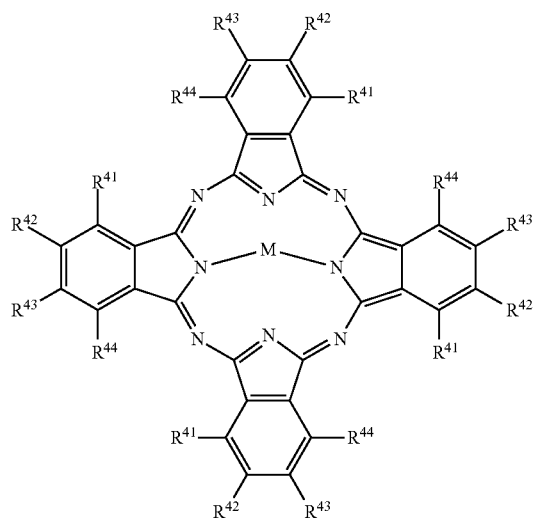

wherein:
M represents a metal ion selected from Li, Na, K, Cu, Ag, Be, Mg, Ca, Ba, Zn, Cd, Hg, Al, Sn, Pb, V, Sb, Cr, Mo, Mn, Fe, Co, Ni, Pd, or Pt, and
$R^{41}$ to $R^{44}$ each independently represent one of hydrogen, alkyl, cycloalkyl, alkenyl, substituted or unsubstituted aryl, heteroaryl, or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, the atoms required to form fused aromatic or heteroaromatic rings, and solubilizing groups.

26. The stereo viewing device of claim 1, wherein the first lens filter further comprises a dichroic filter lens portion, and the first polymethine dye is provided at least on an edge of the first lens filter to selectively absorb at least a portion of the leakage light allowed through the dichroic filter lens portion.

27. A stereo viewing device, comprising: a first lens comprising a first lens filter, the first lens filter comprising a first set of light absorbing dyes that define a first set of rejection bands, and the first set of light absorbing dyes comprising at least a first polymethine dye; and a second lens comprising a second lens filter, the second lens filter comprising a second set of light absorbing dyes that define a second set of rejection bands different from the first set of rejection bands, the second set of light absorbing dyes comprising at least a second polymethine dye, wherein the first set of light absorbing dyes comprises a combination of a hydrophobic polymethine dye and a hydrophilic polymethine dye.

28. The stereo viewing device of claim 27, wherein each of the first and second lens filters each transmit a portion of incident visible light in respective first and second pass bands that are defined by the respective first and second rejection bands to be in the spectral gaps between the respective first and second rejection bands.

29. The stereo viewing device of claim 27, wherein the first lens comprises at least one of (i) a space between the hydrophobic polymethine dye and the hydrophilic polymethine dye, (ii) an amphiphilic polymethine dye between the hydrophobic polymethine dye and the hydrophilic polymethine dye (iii) a cross-link between the hydrophobic polymethine dye and the hydrophilic polymethine dye, (iv) a barrier layer between the hydrophobic polymethine dye and the hydrophilic polymethine dye, and (v) a seal between the hydrophobic polymethine dye and the hydrophilic polymethine dye.

* * * * *